US012739866B2

(12) United States Patent
Cariou et al.

(10) Patent No.: US 12,739,866 B2
(45) Date of Patent: Sep. 15, 2026

(54) APPARATUS, SYSTEM, AND METHOD OF COMMUNICATING A MILLIMETERWAVE (mmWave) PHYSICAL LAYER (PHY) PROTOCOL DATA UNIT (PPDU) OVER AN mmWave WIRELESS COMMUNICATION CHANNEL

(71) Applicant: INTEL CORPORATION, Santa Clara, CA (US)

(72) Inventors: Laurent Cariou, Milizac (FR); Thomas J. Kenney, Portland, OR (US)

(73) Assignee: INTEL CORPORATION, Santa Clara, CA (US)

( * ) Notice: Subject to any disclaimer, the term of this patent is extended or adjusted under 35 U.S.C. 154(b) by 0 days.

(21) Appl. No.: 17/958,345

(22) Filed: Oct. 1, 2022

(65) Prior Publication Data

US 2023/0025172 A1 Jan. 26, 2023

(51) Int. Cl.

*H04W 72/542* (2023.01)
*H04L 5/00* (2006.01)
*H04W 72/044* (2023.01)

(52) U.S. Cl.

CPC ......... *H04W 72/542* (2023.01); *H04L 5/0044* (2013.01); *H04L 5/0094* (2013.01); *H04W 72/044* (2013.01)

(58) Field of Classification Search

CPC .............. H04W 72/542; H04W 72/004; H04L 5/0044; H04L 5/0094

See application file for complete search history.

(56) References Cited

U.S. PATENT DOCUMENTS

2024/0183936 A1* 6/2024 Au .......................... H04L 67/12
2025/0184978 A1* 6/2025 Takada .................. H04L 5/0094

OTHER PUBLICATIONS

IEEE Standard for Information Technology—Telecommunications and Information Exchange between Systems Local and Metropolitan Area Networks—Specific Requirements, Part 11: Wireless LAN Medium Access Control (MAC) and Physical Layer (PHY) Specifications, IEEE Computer Society, IEEE Std 802.11™-2020 (Revision of IEEE Std 802.11-2016), Approved Dec. 3, 2020, 4379 pages.

(Continued)

*Primary Examiner* — Justin Y Lee
(74) *Attorney, Agent, or Firm* — Shichrur & Co.

(57) ABSTRACT

For example, a wireless communication device may be configured to determine an energy state of a 2.16 Gigahertz (GHz) channel bandwidth (BW) in a millimeterWave (mmWave) wireless communication frequency band according to an energy detection mechanism; and, based on the energy state of the 2.16 GHz channel BW, to select between allowing or disabling the wireless communication device to transmit an mmWave Physical layer (PHY) Protocol Data Unit (PPDU) over an mmWave wireless communication channel, which at least partially overlaps the 2.16 GHz channel BW and is different from the 2.16 GHz channel BW, the mmWave wireless communication channel having an mmWave channel BW of at least 80 Megahertz (MHz).

19 Claims, 9 Drawing Sheets

(56) References Cited

OTHER PUBLICATIONS

IEEE Standard for Information Technology—Telecommunications and Information Exchange between Systems Local and Metropolitan Area Networks—Specific Requirements Part 11: Wireless LAN Medium Access Control (MAC) and Physical Layer (PHY) Specifications, Amendment 2: Enhanced Throughput for Operations in License-exempt Bands above 45 Ghz, IEEE Computer Society, IEEE Std 802.11ay™-2021 (Amendment to IEEE Std 802.11™-2020 as amended by IEEE Std 802.11ax™-2021), Approved Mar. 25, 2021, 768 pages.

* cited by examiner

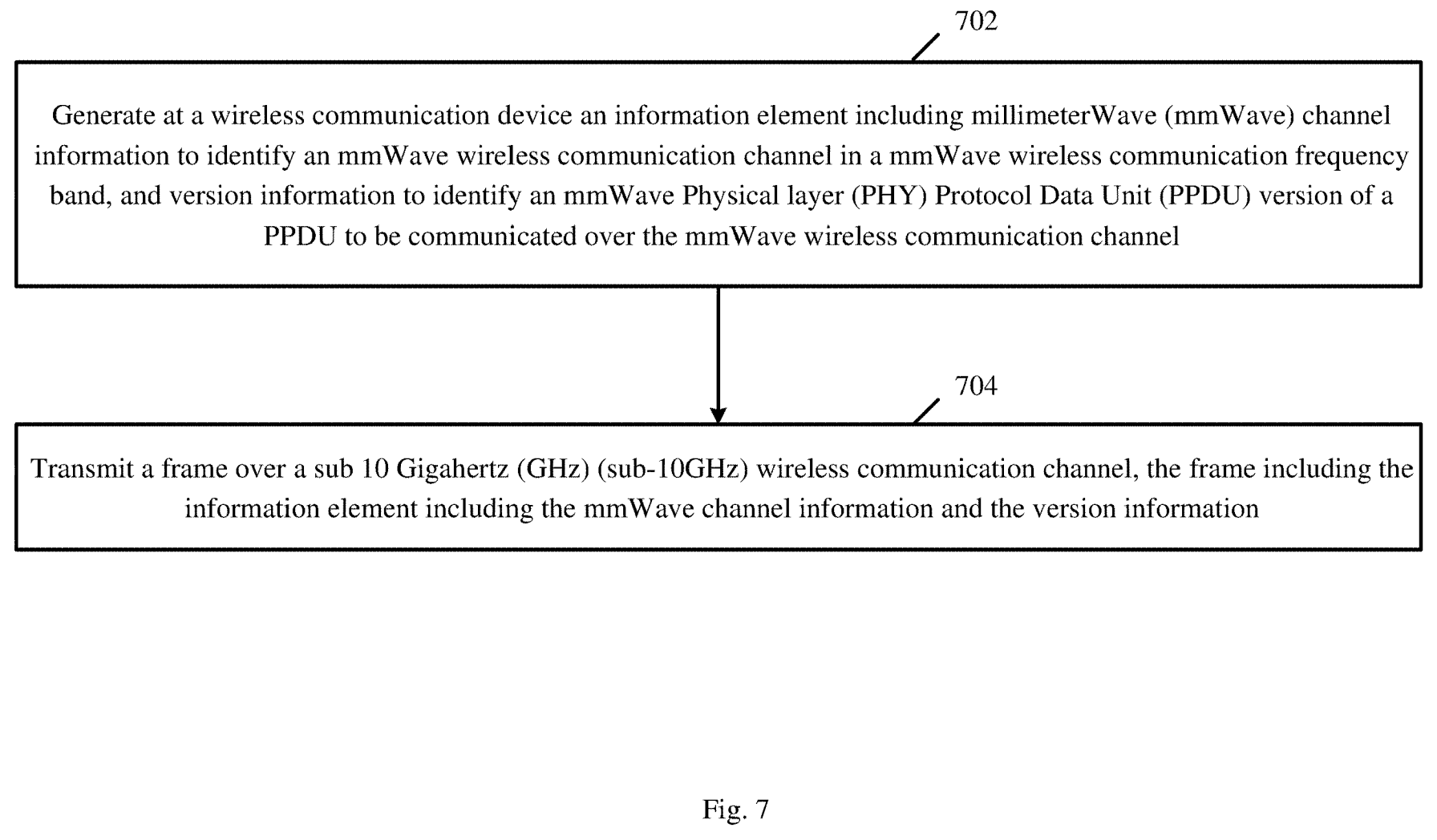

702

Generate at a wireless communication device an information element including millimeterWave (mmWave) channel information to identify an mmWave wireless communication channel in a mmWave wireless communication frequency band, and version information to identify an mmWave Physical layer (PHY) Protocol Data Unit (PPDU) version of a PPDU to be communicated over the mmWave wireless communication channel

704

Transmit a frame over a sub 10 Gigahertz (GHz) (sub-10GHz) wireless communication channel, the frame including the information element including the mmWave channel information and the version information

Fig. 7

APPARATUS, SYSTEM, AND METHOD OF COMMUNICATING A MILLIMETERWAVE (mmWave) PHYSICAL LAYER (PHY) PROTOCOL DATA UNIT (PPDU) OVER AN mmWave WIRELESS COMMUNICATION CHANNEL

TECHNICAL FIELD

Aspects described herein generally relate to communicating a millimeterWave (mmWave) Physical layer (PHY) Protocol Data Unit (PPDU) over an mmWave wireless communication channel.

BACKGROUND

Devices in a wireless communication system may be configured to communicate over a millimeterWave (mmWave) wireless communication channel.

BRIEF DESCRIPTION OF THE DRAWINGS

For simplicity and clarity of illustration, elements shown in the figures have not necessarily been drawn to scale. For example, the dimensions of some of the elements may be exaggerated relative to other elements for clarity of presentation. Furthermore, reference numerals may be repeated among the figures to indicate corresponding or analogous elements. The figures are listed below.

FIG. 7 is a schematic flow-chart illustration of a method of communicating an mmWave PPDU over an mmWave wireless communication channel, in accordance with some demonstrative aspects.

DETAILED DESCRIPTION

Figure 1:
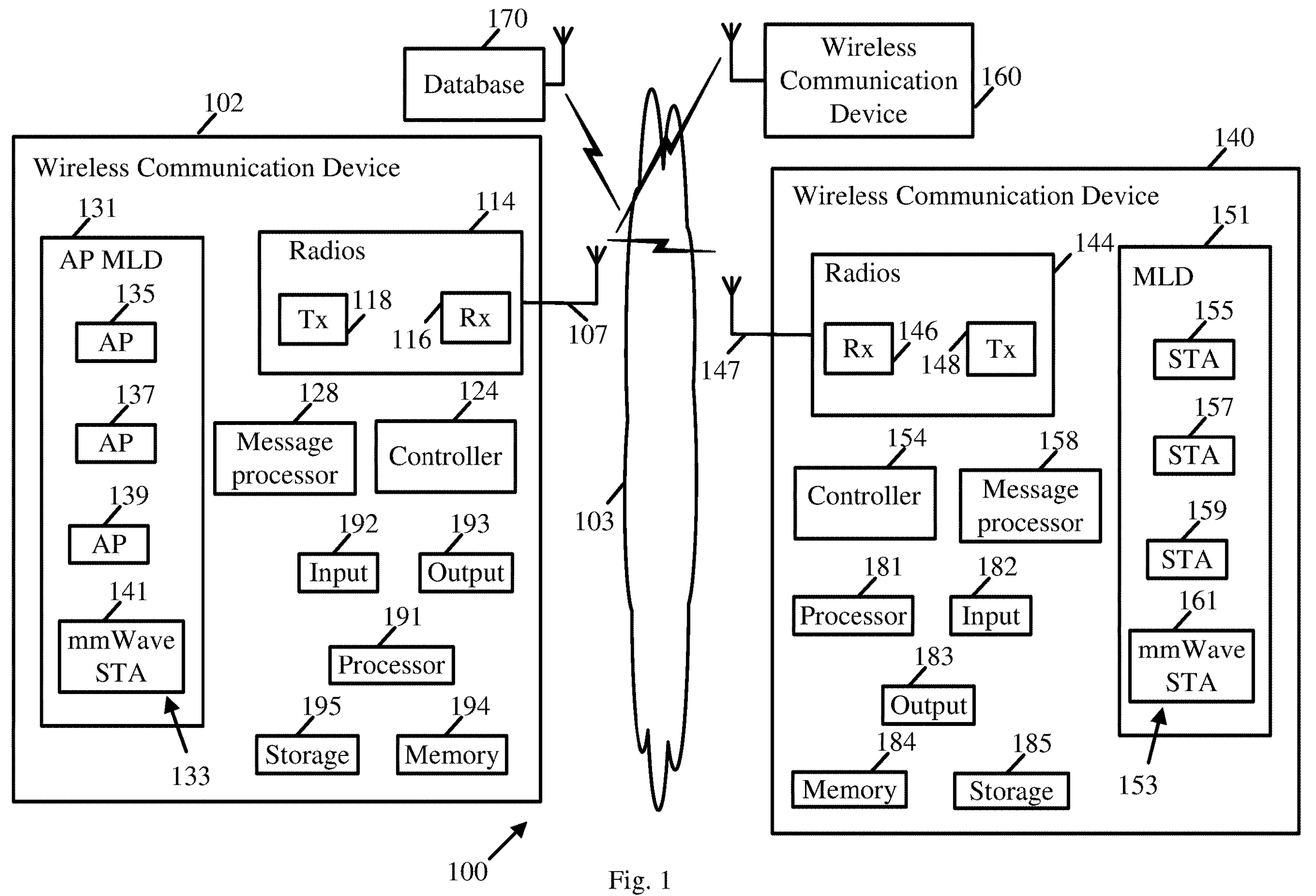
FIG. 1 is a schematic block diagram illustration of a system, in accordance with some demonstrative aspects.

In the following detailed description, numerous specific details are set forth in order to provide a thorough understanding of some aspects. However, it will be understood by persons of ordinary skill in the art that some aspects may be practiced without these specific details. In other instances, well-known methods, procedures, components, units and/or circuits have not been described in detail so as not to obscure the discussion.

Discussions herein utilizing terms such as, for example, "processing", "computing", "calculating", "determining", "establishing", "analyzing", "checking", or the like, may refer to operation(s) and/or process(es) of a computer, a computing platform, a computing system, or other electronic computing device, that manipulate and/or transform data represented as physical (e.g., electronic) quantities within the computer's registers and/or memories into other data similarly represented as physical quantities within the computer's registers and/or memories or other information storage medium that may store instructions to perform operations and/or processes.

The terms "plurality" and "a plurality", as used herein, include, for example, "multiple" or "two or more". For example, "a plurality of items" includes two or more items.

References to "one aspect", "an aspect", "demonstrative aspect", "various aspects" etc., indicate that the aspect(s) so described may include a particular feature, structure, or characteristic, but not every aspect necessarily includes the particular feature, structure, or characteristic. Further, repeated use of the phrase "in one aspect" does not necessarily refer to the same aspect, although it may.

As used herein, unless otherwise specified the use of the ordinal adjectives "first", "second", "third" etc., to describe a common object, merely indicate that different instances of like objects are being referred to, and are not intended to imply that the objects so described must be in a given sequence, either temporally, spatially, in ranking, or in any other manner.

Some aspects may be used in conjunction with various devices and systems, for example, a User Equipment (UE), a Mobile Device (MD), a wireless station (STA), a Personal Computer (PC), a desktop computer, a mobile computer, a laptop computer, a notebook computer, a tablet computer, a server computer, a handheld computer, a handheld device, a wearable device, a sensor device, an Internet of Things (IoT) device, a Personal Digital Assistant (PDA) device, a handheld PDA device, an on-board device, an off-board device, a hybrid device, a vehicular device, a non-vehicular device, a mobile or portable device, a consumer device, a non-mobile or non-portable device, a wireless communication station, a wireless communication device, a wireless Access Point (AP), a wired or wireless router, a wired or wireless modem, a video device, an audio device, an audio-video (A/V) device, a wired or wireless network, a wireless area network, a Wireless Video Area Network (WVAN), a Local Area Network (LAN), a Wireless LAN (WLAN), a Personal Area Network (PAN), a Wireless PAN (WPAN), and the like.

Some aspects may be used in conjunction with devices and/or networks operating in accordance with existing IEEE 802.11 standards (including IEEE 802.11-2020 (*IEEE* 802.11-2020, *IEEE Standard for Information Technology—Telecommunications and Information Exchange between Systems Local and Metropolitan Area Networks—Specific Requirements; Part* 11*: Wireless LAN Medium Access Control* (*MAC*) *and Physical Layer* (*PHY*) *Specifications, December,* 2020); and/or IEEE 802.11be (*IEEE P*802.11*be*/D2.0 *Draft Standard for Information technology—Telecommunications and information exchange between systems Local and metropolitan area networks—Specific requirements; Part* 11*: Wireless LAN Medium Access Control* (*MAC*) *and Physical Layer* (*PHY*) *Specifications; Amend-*

*ment 8: Enhancements for extremely high throughput (EHT), May* 2022)) and/or future versions and/or derivatives thereof, devices and/or networks operating in accordance with existing cellular specifications and/or protocols, and/or future versions and/or derivatives thereof, units and/or devices which are part of the above networks, and the like.

Some aspects may be used in conjunction with one way and/or two-way radio communication systems, cellular radio-telephone communication systems, a mobile phone, a cellular telephone, a wireless telephone, a Personal Communication Systems (PCS) device, a PDA device which incorporates a wireless communication device, a mobile or portable Global Positioning System (GPS) device, a device which incorporates a GPS receiver or transceiver or chip, a device which incorporates an RFID element or chip, a Multiple Input Multiple Output (MIMO) transceiver or device, a Single Input Multiple Output (SIMO) transceiver or device, a Multiple Input Single Output (MISO) transceiver or device, a device having one or more internal antennas and/or external antennas, Digital Video Broadcast (DVB) devices or systems, multi-standard radio devices or systems, a wired or wireless handheld device, e.g., a Smartphone, a Wireless Application Protocol (WAP) device, or the like.

Some aspects may be used in conjunction with one or more types of wireless communication signals and/or systems, for example, Radio Frequency (RF), Infra-Red (IR), Frequency-Division Multiplexing (FDM), Orthogonal FDM (OFDM), Orthogonal Frequency-Division Multiple Access (OFDMA), FDM Time-Division Multiplexing (TDM), Time-Division Multiple Access (TDMA), Multi-User MIMO (MU-MIMO), Spatial Division Multiple Access (SDMA), Extended TDMA (E-TDMA), General Packet Radio Service (GPRS), extended GPRS, Code-Division Multiple Access (CDMA), Wideband CDMA (WCDMA), CDMA 2000, single-carrier CDMA, multi-carrier CDMA, Multi-Carrier Modulation (MDM), Discrete Multi-Tone (DMT), Bluetooth®, Global Positioning System (GPS), Wi-Fi, Wi-Max, ZigBee™, Ultra-Wideband (UWB), 4G, Fifth Generation (5G), or Sixth Generation (6G) mobile networks, 3GPP, Long Term Evolution (LTE), LTE advanced, Enhanced Data rates for GSM Evolution (EDGE), or the like. Other aspects may be used in various other devices, systems and/or networks.

The term "wireless device", as used herein, includes, for example, a device capable of wireless communication, a communication device capable of wireless communication, a communication station capable of wireless communication, a portable or non-portable device capable of wireless communication, or the like. In some demonstrative aspects, a wireless device may be or may include a peripheral that may be integrated with a computer, or a peripheral that may be attached to a computer. In some demonstrative aspects, the term "wireless device" may optionally include a wireless service.

The term "communicating" as used herein with respect to a communication signal includes transmitting the communication signal and/or receiving the communication signal. For example, a communication unit, which is capable of communicating a communication signal, may include a transmitter to transmit the communication signal to at least one other communication unit, and/or a communication receiver to receive the communication signal from at least one other communication unit. The verb communicating may be used to refer to the action of transmitting or the action of receiving. In one example, the phrase "communicating a signal" may refer to the action of transmitting the signal by a first device, and may not necessarily include the action of receiving the signal by a second device. In another example, the phrase "communicating a signal" may refer to the action of receiving the signal by a first device, and may not necessarily include the action of transmitting the signal by a second device. The communication signal may be transmitted and/or received, for example, in the form of Radio Frequency (RF) communication signals, and/or any other type of signal.

As used herein, the term "circuitry" may refer to, be part of, or include, an Application Specific Integrated Circuit (ASIC), an integrated circuit, an electronic circuit, a processor (shared, dedicated or group), and/or memory (shared. Dedicated, or group), that execute one or more software or firmware programs, a combinational logic circuit, and/or other suitable hardware components that provide the described functionality. In some aspects, some functions associated with the circuitry may be implemented by, one or more software or firmware modules. In some aspects, circuitry may include logic, at least partially operable in hardware.

The term "logic" may refer, for example, to computing logic embedded in circuitry of a computing apparatus and/or computing logic stored in a memory of a computing apparatus. For example, the logic may be accessible by a processor of the computing apparatus to execute the computing logic to perform computing functions and/or operations. In one example, logic may be embedded in various types of memory and/or firmware, e.g., silicon blocks of various chips and/or processors. Logic may be included in, and/or implemented as part of, various circuitry, e.g. radio circuitry, receiver circuitry, control circuitry, transmitter circuitry, transceiver circuitry, processor circuitry, and/or the like. In one example, logic may be embedded in volatile memory and/or non-volatile memory, including random access memory, read only memory, programmable memory, magnetic memory, flash memory, persistent memory, and the like. Logic may be executed by one or more processors using memory, e.g., registers, stuck, buffers, and/or the like, coupled to the one or more processors, e.g., as necessary to execute the logic.

Some demonstrative aspects may be used in conjunction with a WLAN, e.g., a WiFi network. Other aspects may be used in conjunction with any other suitable wireless communication network, for example, a wireless area network, a "piconet", a WPAN, a WVAN and the like.

Some demonstrative aspects may be used in conjunction with a wireless communication network communicating over a sub-10 Gigahertz (GHz) frequency band, for example, a 2.4 GHz frequency band, a 5 GHz frequency band, a 6 GHz frequency band, and/or any other frequency band below 10 GHz.

Some demonstrative aspects may be used in conjunction with a wireless communication network communicating over an Extremely High Frequency (EHF) band (also referred to as the "millimeter wave (mmWave)" frequency band), for example, a frequency band within the frequency band of between 20 Ghz and 300 GHz, for example, a frequency band above 45 GHz, e.g., a 60 GHz frequency band, and/or any other mmWave frequency band.

Some demonstrative aspects may be used in conjunction with a wireless communication network communicating over the sub-10 GHz frequency band and/or the mmWave frequency band, e.g., as described below. However, other aspects may be implemented utilizing any other suitable wireless communication frequency bands, for example, a 5G frequency band, a frequency band below 20 GHz, a Sub 1 GHz (S1G) band, a WLAN frequency band, a WPAN frequency band, and the like.

Some demonstrative aspects may be implemented by a mmWave STA (mSTA), which may include for example, a STA having a radio transmitter, which is capable of operating on a channel that is within the mmWave frequency band. In one example, mmWave communications may involve one or more directional links to communicate at a rate of multiple gigabits per second, for example, at least 1 Gigabit per second, e.g., at least 7 Gigabit per second, at least 30 Gigabit per second, or any other rate.

In some demonstrative aspects, the mmWave STA may include a Directional Multi-Gigabit (DMG) STA, which may be configured to communicate over a DMG frequency band. For example, the DMG band may include a frequency band wherein the channel starting frequency is above 45 GHz.

In some demonstrative aspects, the mmWave STA may include an Enhanced DMG (EDMG) STA, which may be configured to implement one or more mechanisms, which may be configured to enable Single User (SU) and/or Multi-User (MU) communication of Downlink (DL) and/or Uplink frames (UL) using a MIMO scheme. For example, the EDMG STA may be configured to implement one or more channel bonding mechanisms, which may, for example, support communication over a channel bandwidth (BW) (also referred to as a "wide channel", an "EDMG channel", or a "bonded channel") including two or more channels, e.g., two or more 2.16 GHz channels. For example, the channel bonding mechanisms may include, for example, a mechanism and/or an operation whereby two or more channels, e.g., 2.16 GHz channels, can be combined, e.g., for a higher bandwidth of packet transmission, for example, to enable achieving higher data rates, e.g., when compared to transmissions over a single channel. Some demonstrative aspects are described herein with respect to communication over a channel BW including two or more 2.16 GHz channels, however other aspects may be implemented with respect to communications over a channel bandwidth, e.g., a "wide" channel, including or formed by any other number of two or more channels, for example, an aggregated channel including an aggregation of two or more channels. For example, the EDMG STA may be configured to implement one or more channel bonding mechanisms, which may, for example, support an increased channel bandwidth, for example, a channel BW of 4.32 GHz, a channel BW of 6.48 GHz, a channel BW of 8.64 GHz, and/or any other additional or alternative channel BW. The EDMG STA may perform other additional or alternative functionality.

In other aspects, the mmWave STA may include any other type of STA and/or may perform other additional or alternative functionality. Other aspects may be implemented by any other apparatus, device and/or station.

The term "antenna", as used herein, may include any suitable configuration, structure and/or arrangement of one or more antenna elements, components, units, assemblies and/or arrays. In some aspects, the antenna may implement transmit and receive functionalities using separate transmit and receive antenna elements. In some aspects, the antenna may implement transmit and receive functionalities using common and/or integrated transmit/receive elements. The antenna may include, for example, a phased array antenna, a single element antenna, a set of switched beam antennas, and/or the like.

Reference is made to FIG. 1, which schematically illustrates a system 100, in accordance with some demonstrative aspects.

As shown in FIG. 1, in some demonstrative aspects, system 100 may include one or more wireless communication devices. For example, system 100 may include a wireless communication device 102, a wireless communication device 140, and/or one or more other devices.

In some demonstrative aspects, devices 102 and/or 140 may include a mobile device or a non-mobile, e.g., a static, device.

For example, devices 102, and/or 140 may include, for example, a UE, an MD, a STA, an AP, a PC, a desktop computer, a mobile computer, a laptop computer, an Ultrabook™ computer, a notebook computer, a tablet computer, a server computer, a handheld computer, an Internet of Things (IoT) device, a sensor device, a handheld device, a wearable device, a PDA device, a handheld PDA device, an on-board device, an off-board device, a hybrid device (e.g., combining cellular phone functionalities with PDA device functionalities), a consumer device, a vehicular device, a non-vehicular device, a mobile or portable device, a non-mobile or non-portable device, a mobile phone, a cellular telephone, a PCS device, a PDA device which incorporates a wireless communication device, a mobile or portable GPS device, a DVB device, a relatively small computing device, a non-desktop computer, a "Carry Small Live Large" (CSLL) device, an Ultra Mobile Device (UMD), an Ultra Mobile PC (UMPC), a Mobile Internet Device (MID), an "Origami" device or computing device, a device that supports Dynamically Composable Computing (DCC), a context-aware device, a video device, an audio device, an A/V device, a Set-Top-Box (STB), a Blu-ray disc (BD) player, a BD recorder, a Digital Video Disc (DVD) player, a High Definition (HD) DVD player, a DVD recorder, a HD DVD recorder, a Personal Video Recorder (PVR), a broadcast HD receiver, a video source, an audio source, a video sink, an audio sink, a stereo tuner, a broadcast radio receiver, a flat panel display, a Personal Media Player (PMP), a digital video camera (DVC), a digital audio player, a speaker, an audio receiver, an audio amplifier, a gaming device, a data source, a data sink, a Digital Still camera (DSC), a media player, a Smartphone, a television, a music player, or the like.

In some demonstrative aspects, device 102 may include, for example, one or more of a processor 191, an input unit 192, an output unit 193, a memory unit 194, and/or a storage unit 195; and/or device 140 may include, for example, one or more of a processor 181, an input unit 182, an output unit 183, a memory unit 184, and/or a storage unit 185. Devices 102 and/or 140 may optionally include other suitable hardware components and/or software components. In some demonstrative aspects, some or all of the components of one or more of devices 102 and/or 140 may be enclosed in a common housing or packaging, and may be interconnected or operably associated using one or more wired or wireless links. In other aspects, components of one or more of devices 102 and/or 140 may be distributed among multiple or separate devices.

In some demonstrative aspects, processor 191 and/or processor 181 may include, for example, a Central Processing Unit (CPU), a Digital Signal Processor (DSP), one or more processor cores, a single-core processor, a dual-core processor, a multiple-core processor, a microprocessor, a host processor, a controller, a plurality of processors or controllers, a chip, a microchip, one or more circuits, circuitry, a logic unit, an Integrated Circuit (IC), an Application-Specific IC (ASIC), or any other suitable multi-purpose or specific processor or controller. Processor 191 may execute instructions, for example, of an Operating System (OS) of device 102 and/or of one or more suitable applications. Processor 181 may execute instructions, for example, of an Operating System (OS) of device 140 and/or of one or more suitable applications.

In some demonstrative aspects, input unit 192 and/or input unit 182 may include, for example, a keyboard, a keypad, a mouse, a touch-screen, a touch-pad, a track-ball, a stylus, a microphone, or other suitable pointing device or input device. Output unit 193 and/or output unit 183 may include, for example, a monitor, a screen, a touch-screen, a flat panel display, a Light Emitting Diode (LED) display unit, a Liquid Crystal Display (LCD) display unit, a plasma display unit, one or more audio speakers or earphones, or other suitable output devices.

In some demonstrative aspects, memory unit 194 and/or memory unit 184 includes, for example, a Random Access Memory (RAM), a Read Only Memory (ROM), a Dynamic RAM (DRAM), a Synchronous DRAM (SD-RAM), a flash memory, a volatile memory, a non-volatile memory, a cache memory, a buffer, a short term memory unit, a long term memory unit, or other suitable memory units. Storage unit 195 and/or storage unit 185 may include, for example, a hard disk drive, a floppy disk drive, a Compact Disk (CD) drive, a CD-ROM drive, a DVD drive, or other suitable removable or non-removable storage units. Memory unit 194 and/or storage unit 195, for example, may store data processed by device 102. Memory unit 184 and/or storage unit 185, for example, may store data processed by device 140.

In some demonstrative aspects, wireless communication devices 102 and/or 140 may be capable of communicating content, data, information and/or signals via a wireless medium (WM) 103. In some demonstrative aspects, wireless medium 103 may include, for example, a radio channel, an RF channel, a WiFi channel, a cellular channel, a 5G channel, an IR channel, a Bluetooth (BT) channel, a Global Navigation Satellite System (GNSS) Channel, and the like.

In some demonstrative aspects, WM 103 may include one or more wireless communication frequency bands and/or channels. For example, WM 103 may include one or more channels in a sub-10 Ghz wireless communication frequency band, for example, one or more channels in a 2.4 GHz wireless communication frequency band, one or more channels in a 5 GHz wireless communication frequency band, and/or one or more channels in a 6 GHz wireless communication frequency band. For example, WM 103 may additionally or alternatively include one or more channels in a mmWave wireless communication frequency band.

In other aspects, WM 103 may include any other type of channel over any other frequency band.

In some demonstrative aspects, device 102 and/or device 140 may include one or more radios including circuitry and/or logic to perform wireless communication between devices 102, 140, and/or one or more other wireless communication devices. For example, device 102 may include one or more radios 114, and/or device 140 may include one or more radios 144.

In some demonstrative aspects, radios 114 and/or 144 may include one or more wireless receivers (Rx) including circuitry and/or logic to receive wireless communication signals, RF signals, frames, blocks, transmission streams, packets, messages, data items, and/or data. For example, a radio 114 may include at least one receiver 116, and/or a radio 144 may include at least one receiver 146.

In some demonstrative aspects, radios 114 and/or 144 may include one or more wireless transmitters (Tx) including circuitry and/or logic to transmit wireless communication signals, RF signals, frames, blocks, transmission streams, packets, messages, data items, and/or data. For example, a radio 114 may include at least one transmitter 118, and/or a radio 144 may include at least one transmitter 148.

In some demonstrative aspects, radios 114 and/or 144, transmitters 118 and/or 148, and/or receivers 116 and/or 146 may include circuitry; logic; Radio Frequency (RF) elements, circuitry and/or logic; baseband elements, circuitry and/or logic; modulation elements, circuitry and/or logic; demodulation elements, circuitry and/or logic; amplifiers; analog to digital and/or digital to analog converters; filters; and/or the like. For example, radios 114 and/or 144 may include or may be implemented as part of a wireless Network Interface Card (NIC), and the like.

In some demonstrative aspects, radios 114 and/or 144 may be configured to communicate over a sub-10 Ghz band, for example, 2.4 GHz band, a 5 GHz band, a 6 GHz band, and/or any other sub-10 GHz band; and/or an mmWave band, e.g., a 45 Ghz band, a 60 Ghz band, and/or any other mmWave band; and/or any other band, e.g., a 5G band, an S1G band, and/or any other band.

In some demonstrative aspects, radios 114 and/or 144 may include, or may be associated with one or more, e.g., a plurality of, antennas.

In some demonstrative aspects, device 102 may include one or more, e.g., a plurality of, antennas 107, and/or device 140 may include one or more, e.g., a plurality of, antennas 147.

Antennas 107 and/or 147 may include any type of antennas suitable for transmitting and/or receiving wireless communication signals, blocks, frames, transmission streams, packets, messages and/or data. For example, antennas 107 and/or 147 may include any suitable configuration, structure and/or arrangement of one or more antenna elements, components, units, assemblies and/or arrays. In some aspects, antennas 107 and/or 147 may implement transmit and receive functionalities using separate transmit and receive antenna elements. In some aspects, antennas 107 and/or 147 may implement transmit and receive functionalities using common and/or integrated transmit/receive elements.

In some demonstrative aspects, device 102 may include a controller 124, and/or device 140 may include a controller 154. Controller 124 may be configured to perform and/or to trigger, cause, instruct and/or control device 102 to perform, one or more communications, to generate and/or communicate one or more messages and/or transmissions, and/or to perform one or more functionalities, operations and/or procedures between devices 102, 140 and/or one or more other devices; and/or controller 154 may be configured to perform, and/or to trigger, cause, instruct and/or control device 140 to perform, one or more communications, to generate and/or communicate one or more messages and/or transmissions, and/or to perform one or more functionalities, operations and/or procedures between devices 102, 140 and/or one or more other devices, e.g., as described below.

In some demonstrative aspects, controllers 124 and/or 154 may include, or may be implemented, partially or entirely, by circuitry and/or logic, e.g., one or more processors including circuitry and/or logic, memory circuitry and/or logic, Media-Access Control (MAC) circuitry and/or logic, Physical Layer (PHY) circuitry and/or logic, baseband (BB) circuitry and/or logic, a BB processor, a BB memory, Application Processor (AP) circuitry and/or logic, an AP processor, an AP memory, and/or any other circuitry and/or logic, configured to perform the functionality of controllers 124 and/or 154, respectively. Additionally or alternatively, one or more functionalities of controllers 124 and/or 154 may be implemented by logic, which may be executed by a machine and/or one or more processors, e.g., as described below.

In one example, controller 124 may include circuitry and/or logic, for example, one or more processors including circuitry and/or logic, to cause, trigger and/or control a wireless device, e.g., device 102, and/or a wireless station, e.g., a wireless STA implemented by device 102, to perform one or more operations, communications and/or functionalities, e.g., as described herein. In one example, controller 124 may include at least one memory, e.g., coupled to the one or more processors, which may be configured, for example, to store, e.g., at least temporarily, at least some of the information processed by the one or more processors and/or circuitry, and/or which may be configured to store logic to be utilized by the processors and/or circuitry.

In one example, controller 154 may include circuitry and/or logic, for example, one or more processors including circuitry and/or logic, to cause, trigger and/or control a wireless device, e.g., device 140, and/or a wireless station, e.g., a wireless STA implemented by device 140, to perform one or more operations, communications and/or functionalities, e.g., as described herein. In one example, controller 154 may include at least one memory, e.g., coupled to the one or more processors, which may be configured, for example, to store, e.g., at least temporarily, at least some of the information processed by the one or more processors and/or circuitry, and/or which may be configured to store logic to be utilized by the processors and/or circuitry.

In some demonstrative aspects, at least part of the functionality of controller 124 may be implemented as part of one or more elements of radio 114, and/or at least part of the functionality of controller 154 may be implemented as part of one or more elements of radio 144.

In other aspects, the functionality of controller 124 may be implemented as part of any other element of device 102, and/or the functionality of controller 154 may be implemented as part of any other element of device 140.

In some demonstrative aspects, device 102 may include a message processor 128 configured to generate, process and/or access one or messages communicated by device 102.

In one example, message processor 128 may be configured to generate one or more messages to be transmitted by device 102, and/or message processor 128 may be configured to access and/or to process one or more messages received by device 102, e.g., as described below.

In one example, message processor 128 may include at least one first component configured to generate a message, for example, in the form of a frame, field, information element and/or protocol data unit, for example, a MAC Protocol Data Unit (MPDU); at least one second component configured to convert the message into a PHY Protocol Data Unit (PPDU), for example, by processing the message generated by the at least one first component, e.g., by encoding the message, modulating the message and/or performing any other additional or alternative processing of the message; and/or at least one third component configured to cause transmission of the message over a wireless communication medium, e.g., over a wireless communication channel in a wireless communication frequency band, for example, by applying to one or more fields of the PPDU one or more transmit waveforms. In other aspects, message processor 128 may be configured to perform any other additional or alternative functionality and/or may include any other additional or alternative components to generate and/or process a message to be transmitted.

In some demonstrative aspects, device 140 may include a message processor 158 configured to generate, process and/or access one or more messages communicated by device 140.

In one example, message processor 158 may be configured to generate one or more messages to be transmitted by device 140, and/or message processor 158 may be configured to access and/or to process one or more messages received by device 140, e.g., as described below.

In one example, message processor 158 may include at least one first component configured to generate a message, for example, in the form of a frame, field, information element and/or protocol data unit, for example, an MPDU; at least one second component configured to convert the message into a PPDU, for example, by processing the message generated by the at least one first component, e.g., by encoding the message, modulating the message and/or performing any other additional or alternative processing of the message; and/or at least one third component configured to cause transmission of the message over a wireless communication medium, e.g., over a wireless communication channel in a wireless communication frequency band, for example, by applying to one or more fields of the PPDU one or more transmit waveforms. In other aspects, message processor 158 may be configured to perform any other additional or alternative functionality and/or may include any other additional or alternative components to generate and/or process a message to be transmitted.

In some demonstrative aspects, message processors 128 and/or 158 may include, or may be implemented, partially or entirely, by circuitry and/or logic, e.g., one or more processors including circuitry and/or logic, memory circuitry and/or logic, MAC circuitry and/or logic, PHY circuitry and/or logic, BB circuitry and/or logic, a BB processor, a BB memory, AP circuitry and/or logic, an AP processor, an AP memory, and/or any other circuitry and/or logic, configured to perform the functionality of message processors 128 and/or 158, respectively. Additionally or alternatively, one or more functionalities of message processors 128 and/or 158 may be implemented by logic, which may be executed by a machine and/or one or more processors, e.g., as described below.

In some demonstrative aspects, at least part of the functionality of message processor 128 may be implemented as part of radio 114, and/or at least part of the functionality of message processor 158 may be implemented as part of radio 144.

In some demonstrative aspects, at least part of the functionality of message processor 128 may be implemented as part of controller 124, and/or at least part of the functionality of message processor 158 may be implemented as part of controller 154.

In other aspects, the functionality of message processor 128 may be implemented as part of any other element of device 102, and/or the functionality of message processor 158 may be implemented as part of any other element of device 140.

In some demonstrative aspects, at least part of the functionality of controller 124 and/or message processor 128 may be implemented by an integrated circuit, for example, a chip, e.g., a System on Chip (SoC). In one example, the chip or SoC may be configured to perform one or more functionalities of one or more radios 114. For example, the chip or SoC may include one or more elements of controller

124, one or more elements of message processor 128, and/or one or more elements of one or more radios 114. In one example, controller 124, message processor 128, and one or more radios 114 may be implemented as part of the chip or SoC.

In other aspects, controller 124, message processor 128 and/or the one or more radios 114 may be implemented by one or more additional or alternative elements of device 102.

In some demonstrative aspects, at least part of the functionality of controller 154 and/or message processor 158 may be implemented by an integrated circuit, for example, a chip, e.g., a SoC. In one example, the chip or SoC may be configured to perform one or more functionalities of one or more radios 144. For example, the chip or SoC may include one or more elements of controller 154, one or more elements of message processor 158, and/or one or more elements of one or more radios 144. In one example, controller 154, message processor 158, and one or more radios 144 may be implemented as part of the chip or SoC.

In other aspects, controller 154, message processor 158 and/or one or more radios 144 may be implemented by one or more additional or alternative elements of device 140.

In some demonstrative aspects, device 102 and/or device 140 may include, operate as, perform the role of, and/or perform one or more functionalities of, one or more STAs. For example, device 102 may include at least one STA, and/or device 140 may include at least one STA.

In some demonstrative aspects, device 102 and/or device 140 may include, operate as, perform the role of, and/or perform one or more functionalities of, one or more Extremely High Throughput (EHT) STAs. For example, device 102 may include, operate as, perform the role of, and/or perform one or more functionalities of, one or more EHT STAs, and/or device 140 may include, operate as, perform the role of, and/or perform one or more functionalities of, one or more EHT STAs.

In some demonstrative aspects, device 102 and/or device 140 may include, operate as, perform the role of, and/or perform one or more functionalities of, one or more mmWave STAs, e.g., DMG STAs, EDMG STAs, and/or any other mmWave STA. For example, device 102 may include, operate as, perform the role of, and/or perform one or more functionalities of, one or more mmWave STAs, and/or device 140 may include, operate as, perform the role of, and/or perform one or more functionalities of, one or more mmWave STAs.

In other aspects, devices 102, and/or 140 may include, operate as, perform the role of, and/or perform one or more functionalities of, any other wireless device and/or station, e.g., a WLAN STA, a WiFi STA, and the like.

In some demonstrative aspects, device 102 and/or device 140 may be configured to operate as, perform the role of, and/or perform one or more functionalities of, an access point (AP), e.g., an EHT AP STA.

In some demonstrative aspects, device 102 and/or device 140 may be configured to operate as, perform the role of, and/or perform one or more functionalities of, a non-AP STA, e.g., an EHT non-AP STA.

In other aspects, device 102 and/or device 140 may operate as, perform the role of, and/or perform one or more functionalities of, any other additional or alternative device and/or station.

In one example, a station (STA) may include a logical entity that is a singly addressable instance of a medium access control (MAC) and physical layer (PHY) interface to the wireless medium (WM). The STA may perform any other additional or alternative functionality.

In one example, an AP may include an entity that contains one station (STA) and provides access to the distribution services, via the wireless medium (WM) for associated STAs. An AP may include a STA and a distribution system access function (DSAF). The AP may perform any other additional or alternative functionality.

In some demonstrative aspects devices 102 and/or 140 may be configured to communicate in an EHT network, and/or any other network.

In some demonstrative aspects, devices 102 and/or 140 may be configured to operate in accordance with one or more Specifications, for example, including one or more *IEEE* 802.11 *Specifications, e.g., an IEEE* 802.11-2020 *Specification, an IEEE* 802.11*be Specification, an IEEE* 802.11*ay Specification* and/or any other specification and/or protocol.

In some demonstrative aspects, device 102 and/or device 140 may include, operate as, perform a role of, and/or perform the functionality of, one or more multi-link logical entities, e.g., as described below.

In other aspect, device 102 and/or device 140 may include, operate as, perform a role of, and/or perform the functionality of, any other entities, e.g., which are not multi-link logical entities.

For example, a multi-link logical entity may include a logical entity that contains one or more STAs. The logical entity may have one MAC data service interface and primitives to the logical link control (LLC) and a single address associated with the interface, which can be used to communicate on a distribution system medium (DSM). For example, the DSM may include a medium or set of media used by a distribution system (DS) for communications between APs, mesh gates, and the portal of an extended service set (ESS). For example, the DS may include a system used to interconnect a set of basic service sets (BSSs) and integrated local area networks (LANs) to create an extended service set (ESS). In one example, a multi-link logical entity may allow STAs within the multi-link logical entity to have the same MAC address. The multi-link entity may perform any other additional or alternative functionality.

In some demonstrative aspects, device 102 and/or device 140 may include, operate as, perform a role of, and/or perform the functionality of, a Multi-Link Device (MLD). For example, device 102 may include, operate as, perform a role of, and/or perform the functionality of, at least one MLD, and/or device 140 may include, operate as, perform a role of, and/or perform the functionality of, at least one MLD, e.g., as described below.

For example, an MLD may include a device that is a logical entity and has more than one affiliated STA and has a single MAC service access point (SAP) to LLC, which includes one MAC data service. The MLD may perform any other additional or alternative functionality.

In some demonstrative aspects, for example, an infrastructure framework may include a multi-link AP logical entity, which includes APs, e.g., on one side, and a multi-link non-AP logical entity, which includes non-APs, e.g., on the other side.

In some demonstrative aspects, device 102 and/or device 140 may be configured to operate as, perform the role of, and/or perform one or more functionalities of, an AP MLD.

In some demonstrative aspects, device 102 and/or device 140 may be configured to operate as, perform the role of, and/or perform one or more functionalities of, a non-AP MLD.

In other aspects, device 102 and/or device 140 may operate as, perform the role of, and/or perform one or more functionalities of, any other additional or alternative device and/or station.

For example, an AP MLD may include an MLD, where each STA affiliated with the MLD is an AP. In one example, the AP MLD may include a multi-link logical entity, where each STA within the multi-link logical entity is an EHT AP. The AP MLD may perform any other additional or alternative functionality.

For example, a non-AP MLD may include an MLD, where each STA affiliated with the MLD is a non-AP STA. In one example, the non-AP MLD may include a multi-link logical entity, where each STA within the multi-link logical entity is a non-AP EHT STA. The non-AP MLD may perform any other additional or alternative functionality.

In one example, a multi-link infrastructure framework may be configured as an extension from a one link operation between two STAs, e.g., an AP and a non-AP STA.

In some demonstrative aspects, controller 124 may be configured to control, perform and/or to trigger, cause, instruct and/or control device 102 to operate as, perform a role of, and/or perform one or more operations and/or functionalities of, an AP MLD 131 including a plurality of STAs 133, e.g., including an AP STA 135, an AP STA 137, an AP STA 139, and/or an mmWave STA 141. In some aspects, as shown in FIG. 1, AP MLD 131 may include four STAs. In other aspects, AP MLD 131 may include any other number of STAs.

In one example, AP STA 135, AP STA 137, AP STA 139, and/or mmWave STA 141 may operate as, perform a role of, and/or perform one or more operations and/or functionalities of, an EHT AP STA. In other aspects, AP STA 135, AP STA 137, AP STA 139, and/or mmWave STA 141 may perform any other additional or alternative functionality.

In some demonstrative aspects, mmWave STA 141 may operate as, perform a role of, and/or perform one or more operations and/or functionalities of, a mmWave AP STA. In other aspects, mmWave STA 141 may operate as, perform a role of, and/or perform one or more operations and/or functionalities of an mmWave network controller to control communication over an mmWave wireless communication network.

In some demonstrative aspects, for example, the one or more radios 114 may include, for example, a radio for communication by AP STA 135 over a first wireless communication frequency channel and/or frequency band, e.g., a 2.4 Ghz band, as described below.

In some demonstrative aspects, for example, the one or more radios 114 may include, for example, a radio for communication by AP STA 137 over a second wireless communication frequency channel and/or frequency band, e.g., a 5 Ghz band, as described below.

In some demonstrative aspects, for example, the one or more radios 114 may include, for example, a radio for communication by AP STA 139 over a third wireless communication frequency channel and/or frequency band, e.g., a 6 Ghz band, as described below.

In some demonstrative aspects, for example, the one or more radios 114 may include, for example, a radio for communication by mmWave STA 141 over a fourth wireless communication frequency channel and/or frequency band, e.g., an mmWave band, for example, a wireless communication band above 45 Ghz, for example, a 60 GHz band or any other mmWave band, e.g., as described below.

In some demonstrative aspects, the radios 114 utilized by STAs 133 may be implemented as separate radios. In other aspects, the radios 114 utilized by STAs 133 may be implemented by one or more shared and/or common radios and/or radio components.

In other aspects controller 124 may be configured to control, perform and/or to trigger, cause, instruct and/or control device 102 to operate as, perform a role of, and/or perform one or more operations and/or functionalities of, any other additional or alternative entity and/or STA, e.g., a single STA, multiple STAs, and/or a non-MLD entity.

In some demonstrative aspects, controller 154 may be configured to control, perform and/or to trigger, cause, instruct and/or control device 140 to operate as, perform a role of, and/or perform one or more operations and/or functionalities of, an MLD 151 including a plurality of STAs 153, e.g., including a STA 155, a STA 157, a STA 159, and/or a STA 161. In some aspects, as shown in FIG. 1, MLD 151 may include four STAs. In other aspects, MLD 151 may include any other number of STAs.

In one example, STA 155, STA 157, STA 159, and/or STA 161 may operate as, perform a role of, and/or perform one or more operations and/or functionalities of, an EHT STA. In other aspects, STA 155, STA 157, STA 159, and/or STA 161 may perform any other additional or alternative functionality.

In some demonstrative aspects, STA 161 may be configured to operate as, perform a role of, and/or perform one or more operations and/or functionalities of, an mmWave STA, e.g., as described below. For example, the mmWave STA 161 may be configured to operate as, perform a role of, and/or perform one or more operations and/or functionalities of, a non-AP mmWave STA, e.g., as described below.

In some demonstrative aspects, for example, the one or more radios 144 may include, for example, a radio for communication by STA 155 over a first wireless communication frequency channel and/or frequency band, e.g., a 2.4 Ghz band, as described below.

In some demonstrative aspects, for example, the one or more radios 144 may include, for example, a radio for communication by STA 157 over a second wireless communication frequency channel and/or frequency band, e.g., a 5 Ghz band, as described below.

In some demonstrative aspects, for example, the one or more radios 144 may include, for example, a radio for communication by STA 159 over a third wireless communication frequency channel and/or frequency band, e.g., a 6 Ghz band, as described below.

In some demonstrative aspects, for example, the one or more radios 144 may include, for example, a radio for communication by mmWave STA 161 over a fourth wireless communication frequency channel and/or frequency band, e.g., a mmWave band, as described below.

In some demonstrative aspects, the radios 144 utilized by STAs 153 may be implemented as separate radios. In other aspects, the radios 144 utilized by STAs 153 may be implemented by one or more shared and/or common radios and/or radio components.

In some demonstrative aspects, controller 154 may be configured to control, perform and/or to trigger, cause, instruct and/or control MLD 151 to operate as, perform a role of, and/or perform one or more operations and/or functionalities of, a non-AP MLD. For example, STA 155, STA 157, STA 159, and/or mmWave STA 161 may operate as, perform a role of, and/or perform one or more operations and/or functionalities of, a non-AP STA, e.g., a non-AP EHT STA.

In some demonstrative aspects, controller 154 may be configured to control, perform and/or to trigger, cause, instruct and/or control MLD 151 to operate as, perform a role of, and/or perform one or more operations and/or functionalities of, an AP MLD. For example, STA 155, STA 157, STA 159, and/or mmWave STA 161 may operate as, perform a role of, and/or perform one or more operations and/or functionalities of, an AP EHT STA.

In other aspects controller 154 may be configured to control, perform and/or to trigger, cause, instruct and/or control device 140 to operate as, perform a role of, and/or perform one or more operations and/or functionalities of, any other additional or alternative entity and/or STA, e.g., a single STA, multiple STAs, and/or a non-MLD entity.

Figure 2:
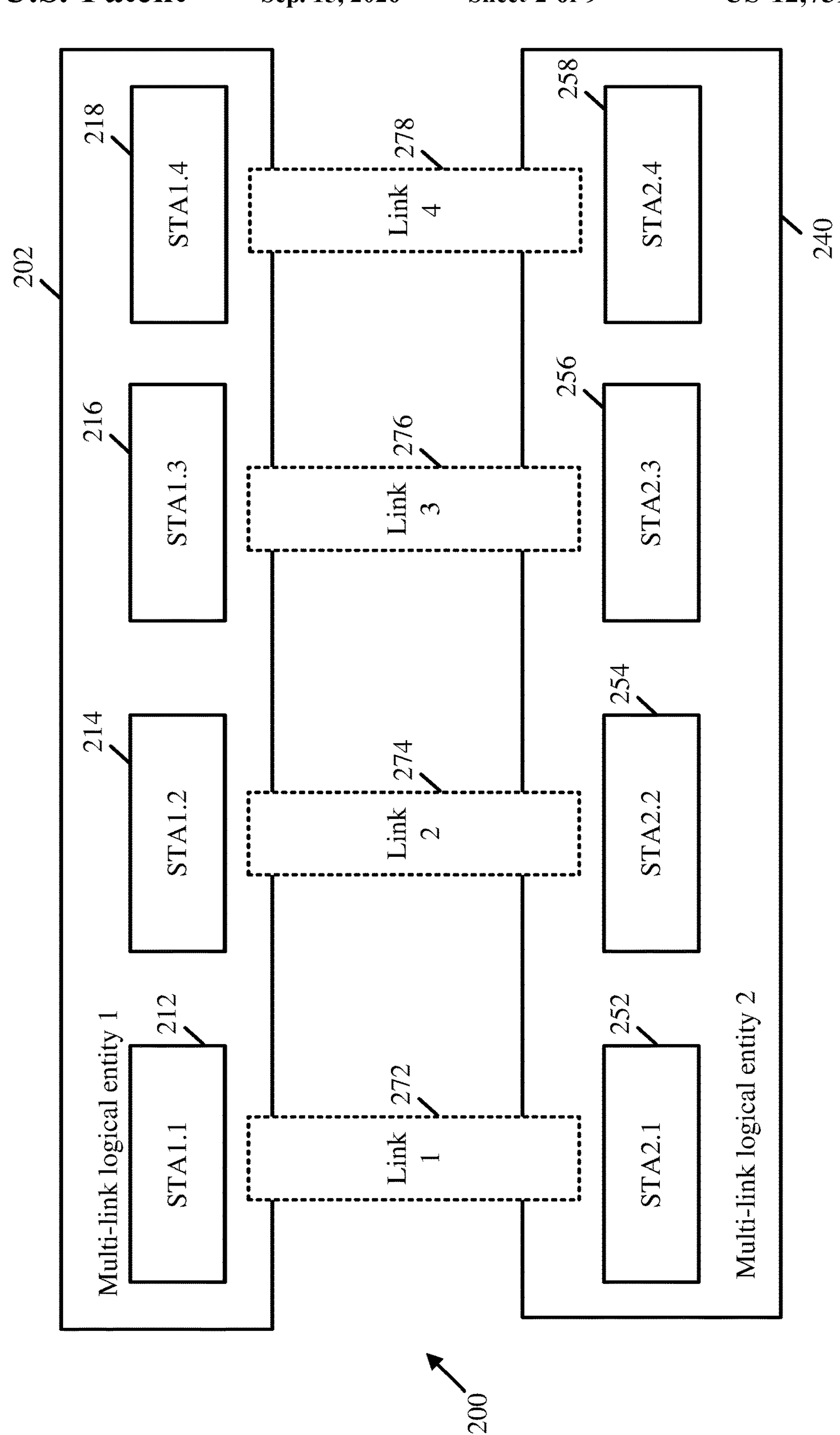
FIG. 2 is a schematic illustration of a multi-link communication scheme, which may be implemented in accordance with some demonstrative aspects.

Reference is made to FIG. 2, which schematically illustrates a multi-link communication scheme 200, which may be implemented in accordance with some demonstrative aspects.

As shown in FIG. 2, a first multi-link logical entity 202 ("multi-link logical entity 1"), e.g., a first MLD, may include a plurality of STAs, e.g., including a STA 212, a STA 214, a STA 216, and a STA 218. In one example, AP MLD 131 (FIG. 1) may perform one or more operations of, one or more functionalities of, the role of, and/or the functionality of, multi-link logical entity 202.

As shown in FIG. 2, a second multi-link logical entity 240 ("multi-link logical entity 2"), e.g., a second MLD, may include a plurality of STAs, e.g., including a STA 252, a STA 254, a STA 256, and a STA 258. In one example, MLD 151 (FIG. 1) may perform one or more operations of, one or more functionalities of, the role of, and/or the functionality of, multi-link logical entity 240.

As shown in FIG. 2, multi-link logical entity 202 and multi-link logical entity 240 may be configured to form, setup and/or communicate over a plurality of links, for example, including a link 272 between STA 212 and STA 252, a link 274 between STA 214 and STA 254, a link 276 between STA 216 and STA 256, and/or a link 278 between STA 218 and STA 258.

Figure 3:
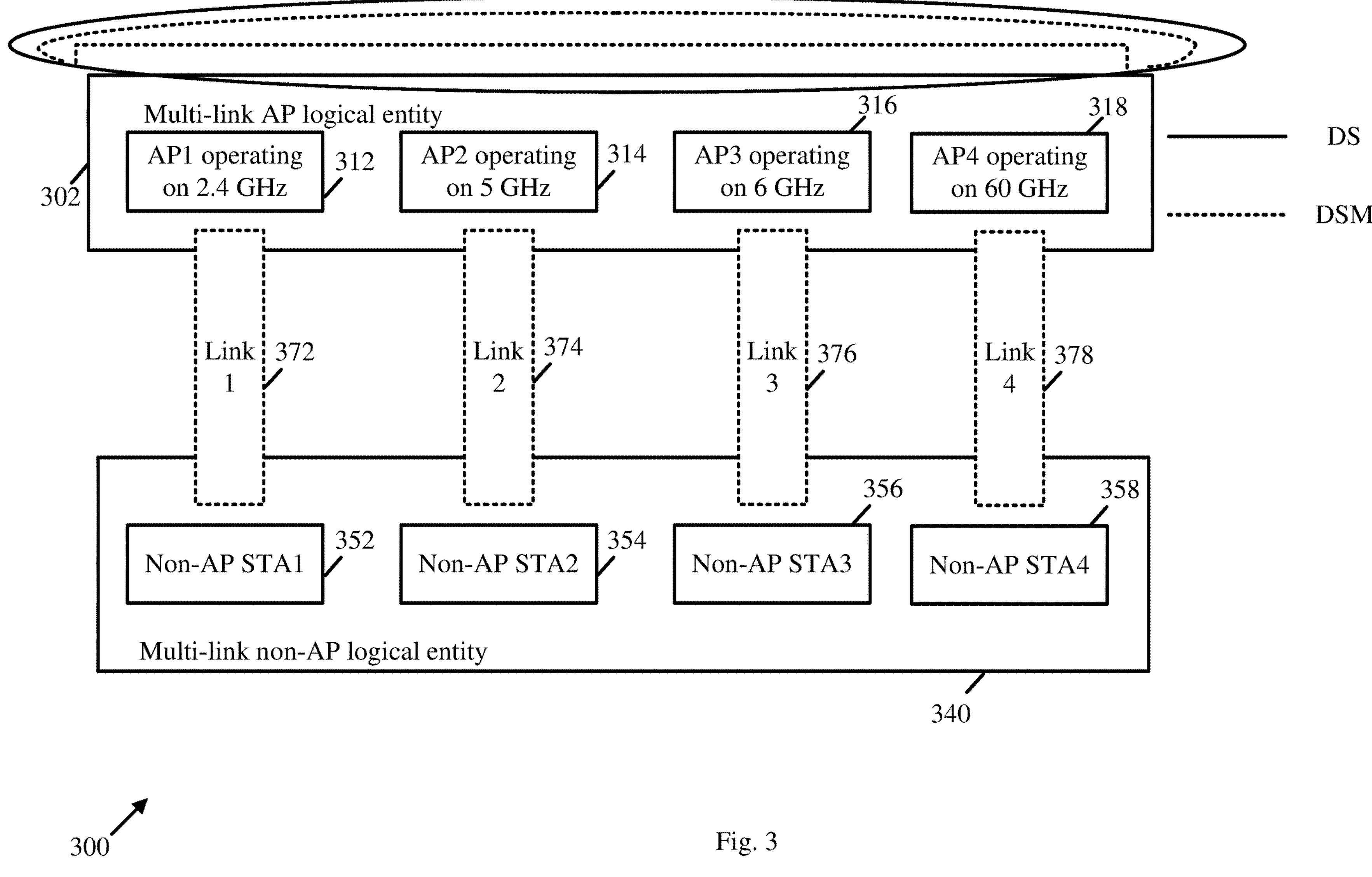
FIG. 3 is a schematic illustration of a multi-link communication scheme, which may be implemented in accordance with some demonstrative aspects.

Reference is made to FIG. 3, which schematically illustrates a multi-link communication scheme 300, which may be implemented in accordance with some demonstrative aspects.

As shown in FIG. 3, a multi-link AP logical entity 302, e.g., an AP MLD, may include a plurality of AP STAs, e.g., including an AP STA 312, an AP STA 314, an AP STA 316, and an mmWave STA 318. In one example, AP MLD 131 (FIG. 1) may perform one or more operations of, one or more functionalities of, the role of, and/or the functionality of, multi-link AP logical entity 302.

As shown in FIG. 3, a multi-link non-AP logical entity 340, e.g., a non-AP MLD, may include a plurality of non-AP STAs, e.g., including a non-AP STA 352, a non-AP STA 354, a non-AP STA 356, and an mmWave STA 358. In one example, MLD 151 (FIG. 1) may perform one or more operations of, one or more functionalities of, the role of, and/or the functionality of, multi-link non-AP logical entity 340.

As shown in FIG. 3, multi-link AP logical entity 302 and multi-link non-AP logical entity 340 may be configured to form, setup and/or communicate over a plurality of links, for example, including a link 372 between AP STA 312 and non-AP STA 352, a link 374 between AP STA 314 and non-AP STA 354, a link 376 between AP STA 316 and non-AP STA 356, and/or a link 378 between mmWave STA 318 and mmWave STA 358.

For example, as shown in FIG. 3, multi-link AP logical entity 302 may include a multi-band AP MLD, which may be configured to communicate over a plurality of wireless communication frequency bands. For example, as shown in FIG. 3, AP STA 312 may be configured to communicate over a 2.4 Ghz frequency band, AP STA 314 may be configured to communicate over a 5 Ghz frequency band, AP STA 316 may be configured to communicate over a 6 Ghz frequency band, and/or mmWave STA 318 may be configured to communicate over a mmWave frequency band. In other aspects, AP STA 312, AP STA 314, AP STA 316, and/or mmWave STA 318 may be configured to communicate over any other additional or alternative wireless communication frequency bands.

Referring back to FIG. 1, in some demonstrative aspects, device 102 and/or device 140 may be configured to communicate over a mmWave frequency band according to an mmWave channelization scheme, e.g., as described below.

In some demonstrative aspects, device 102 and/or device 140 may be configured to provide a technical solution to support mmWave operation, e.g., operation at the 60 GHz band, together with, and/or as part of, a sub-10 Ghz functionality, for example, of a mainstream Wi-Fi protocol, e.g., as described below.

In some demonstrative aspects, device 102 and/or device 140 may be configured to support a technical solution, which may be based on and/or may utilize cost reduction of a wireless communication architecture, which may allow to reuse at least some components of, e.g., as much as possible of, the same baseband, for communications by both a sub-10 GHz radio, e.g., a regular Wi-Fi radio, and a mmWave radio, e.g., a 60 GHz radio.

In some demonstrative aspects, device 102 and/or device 140 may be configured to support a technical solution, which may be based on and/or may utilize an enhanced throughput supported by mmWave techniques, e.g., compared to a sub-10 GHz band (lower band), which may have less potential for throughput enhancement.

In some demonstrative aspects, device 102 and/or device 140 may be configured to support a technical solution, which may be based on, and/or may utilize, a multi-link framework, for example, according to an MLD architecture, e.g., as described above.

In some demonstrative aspects, device 102 and/or device 140 may be configured to utilize the multi-link framework, for example, to improve operation on multiple links. In one example, the multi-link framework may be utilized to allow compensating for a fragility of an mmWave link, e.g., a 60 GHz link, for example, through a fallback to the sub-10 GHz band (lower band) operation.

In some demonstrative aspects, device 102 and/or device 140 may be configured to communicate according to a channelization scheme for an mmWave band, e.g., the 60 GHz band, which may be compatible with a channelization scheme for a sub-10 GHz band, e.g., the sub-7 GHz band.

For example, a mmWave channelization scheme, which is not compatible with a sub-10 GHz channelization scheme may result in a technical issue requiring different PHY and/or different MAC design for a 60 GHz radio and a sub-7 GHz radio, e.g., which may result in a different chip core design.

In some demonstrative aspects, device 102 and/or device 140 may be configured to utilize an mmWave channelization scheme, which may be configured to reuse one or more PHY and/or MAC configurations of a sub-10 GHz design for an mmWave design, e.g., as described below.

For example, reusing PHY and/or MAC components of the sub-10 GHz design for the mmWave design may provide a technical solution to reduce, e.g., minimize, cost and/or investment to implement a 60 GHz radio.

In some demonstrative aspects, there may be a need to provide a technical solution to define one or more main PHY configurations for operation over the mmWave frequency band, e.g., at 60 GHz, for example, in order to reduce, e.g., minimize, a number of changes to a sub-10 GHz baseband (lower baseband) design.

In some demonstrative aspects, device 102 and/or device 140 may be configured to support a technical solution utilizing mmWave PHY characteristics, e.g., 60 GHz PHY characteristics, for example, based on, e.g., as resemblant as possible to, one or more PHY parameters in the sub-10 GHz band (lower band).

In some demonstrative aspects, one or more main PHY characteristics may be defined for operation over the mmWave frequency band, e.g., at 60 GHz, for example, to provide a technical solution to support reusing one or more settings, e.g., most of the settings, of the sub-10 GHz band. In one example, upclocking may be implemented, for example, to adjust sub-10 Ghz characteristics to larger bandwidths at 60 GHz. In one example, subcarrier spacing may be increased, for example, to mitigate phase noise at 60 GHz.

In some demonstrative aspects, device 102 and/or device 140 may be configured to utilize an upclocking mechanism, for example, to generate a PPDU transmission over the mmWave band by upclocking a PPDU transmission of the sub-10 GHz band. For example, upclocking the PPDU transmission may support reusing one or more, e.g., some or all, PHY components from the PHY layer for the sub-10 GHz band and the mmWave band. In one example, the PPDU transmission may be upclocked by a factor of 8 times, and/or any other factor. In one example, the upclocked PPDU may be generated by upclocking a 20 MHz PPDU transmission, e.g., a PPDU transmission complying with an *IEEE* 802.11*ac Specification*, into a 160 MHz PPDU transmission, e.g., an mmWave PPDU transmission equivalent.

In some demonstrative aspects, device 102 and/or device 140 may be configured to utilize an mmWave channelization scheme, which may have a format compatible with a sub-10 GHz channelization scheme, e.g., as described below.

In some demonstrative aspects, the mmWave channelization scheme may be configured to support rechannelization of a 60 GHz band, for example, towards a format compatible with a format of a channelization scheme for a sub-7 GHz band. For example, the format defined for the sub-7 GHz band may be utilized for the 60 GHz band e.g., as described below.

Figure 4:
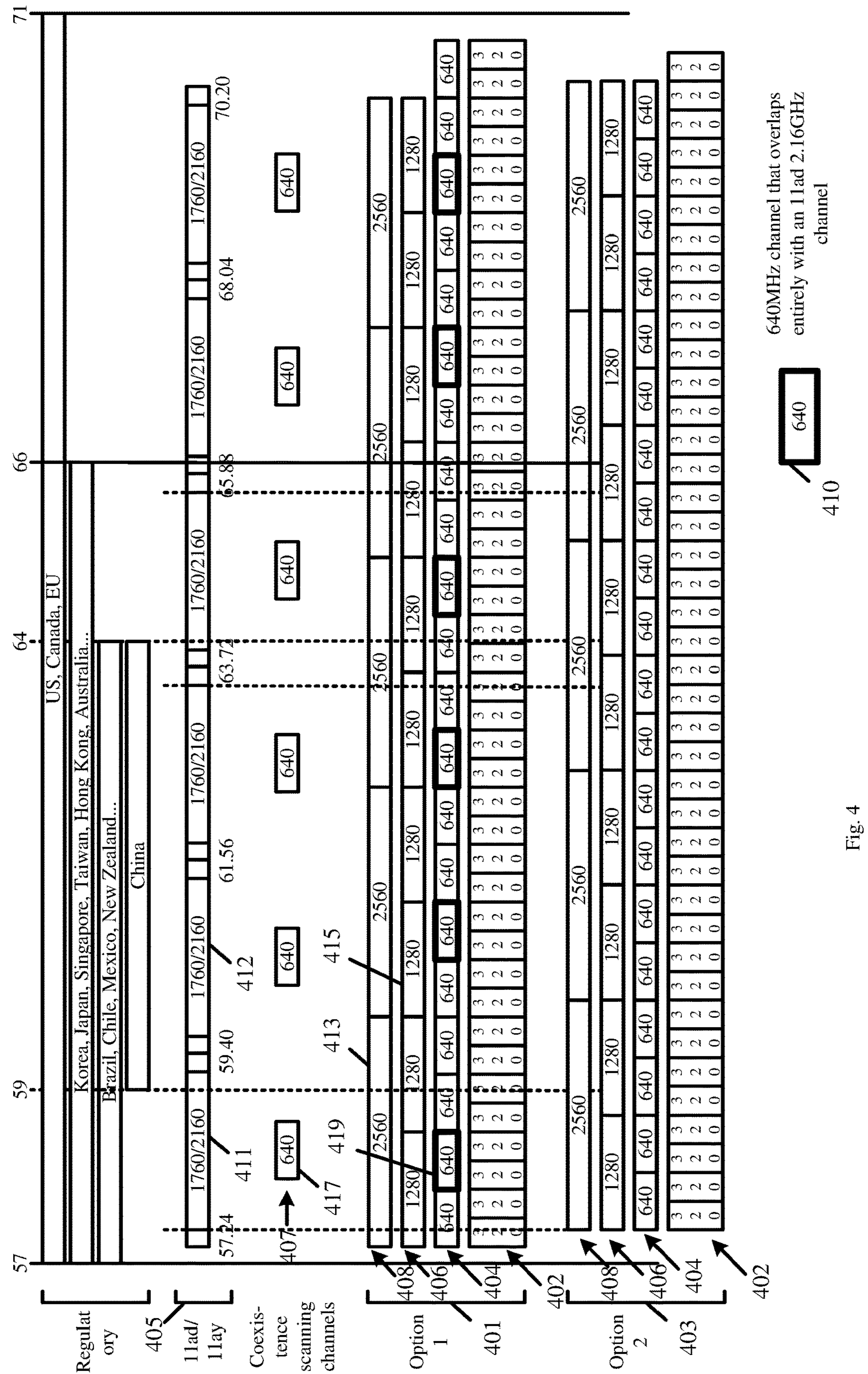
FIG. 4 is a schematic illustration of millimeterWave (mmWave) channels according to first and second mmWave channelization schemes, in accordance with some demonstrative aspects.

Reference is made to FIG. 4, which schematically illustrates mmWave channels according to a first mmWave channelization scheme 401 and a second mmWave channelization scheme 403, in accordance with some demonstrative aspects.

For example, device 102 (FIG. 1) and/or device 140 (FIG. 1) may be configured to communicate mmWave PPDUs over one or more mmWave channels according to the mmWave channelization scheme 401 and/or the mmWave channelization scheme 403.

In some demonstrative aspects, as shown in FIG. 4, the mmWave channelization scheme 401 and/or the mmWave channelization scheme 403 may be configured to define a plurality of mmWave channels, e.g., a plurality of non-overlapping 320/640/1280/2560 mmWave channels and/or any other mmWave channels.

In some demonstrative aspects, as shown in FIG. 4, the mmWave channels defined according the mmWave channelization scheme 401 and/or the mmWave channelization scheme 403 may be misaligned with one or more, e.g., some or all, existing mmWave channels 405, e.g., as defined according to an *IEEE* 802.11*ad/ay Specification.*

In some demonstrative aspects, the mmWave channelization scheme 401 and/or the mmWave channelization scheme 403 may include a plurality of minimal-BW channels having a minimal mmWave channel BW.

In some demonstrative aspects, as shown in FIG. 4, the mmWave channelization scheme 401 and/or the mmWave channelization scheme 403 may include a plurality of minimal-BW channels, e.g., including a plurality of 320 MHz channels 402, having a minimal mmWave channel BW of 320 MHz.

In other aspects, the mmWave channelization scheme 401 and/or the mmWave channelization scheme 403 may include minimal-BW channels having any other minimal mmWave channel BW, for example, a minimal mmWave channel BW of 80 MHz, 160 MHz, or any other minimal BW, e.g., greater than 20 MHz.

For example, as shown in FIG. 4, the plurality of 320 MHz channels 402 may include a plurality of non-overlapping 320 MHz channels.

In some demonstrative aspects, the mmWave channelization scheme 401 and/or the mmWave channelization scheme 403 may include a plurality of 2×-width channels, e.g., each having a channel BW which is double the minimal mmWave channel BW.

For example, as shown in FIG. 4, the plurality of 2×-width channels may include a plurality of 640 MHz channels 404.

For example, as shown in FIG. 4, the plurality of 640 MHz channels 404 may include a plurality of non-overlapping 640 MHz channels.

For example, as shown in FIG. 4, a 640 MHz channel of the plurality of 640 MHz channels 404 may include two contiguous 320 MHz channels 402.

In some demonstrative aspects, the mmWave channelization scheme 401 and/or the mmWave channelization scheme 403 may include a plurality of 4×-width channels, e.g., each having a channel BW which is four times the minimal mmWave channel BW.

For example, as shown in FIG. 4, the plurality of 4×-width channels may include a plurality of 1280 MHz channels 406.

For example, as shown in FIG. 4, the plurality of 1280 MHz channels 406 may include a plurality of non-overlapping 1280 MHz channels.

For example, as shown in FIG. 4, a 1280 MHz channel of the plurality of 1280 MHz channels 406 may include four contiguous 320 MHz channels 402.

In some demonstrative aspects, the mmWave channelization scheme 401 and/or the mmWave channelization scheme 403 may include a plurality of 8×-width channels, e.g., each having a channel BW which is eight times the minimal mmWave channel BW.

For example, as shown in FIG. 4, the plurality of 8×-width channels may include a plurality of 2560 MHz channels 408.

For example, as shown in FIG. 4, the plurality of 2560 MHz channels 408 may include a plurality of non-overlapping 2560 MHz channels.

For example, as shown in FIG. 4, a 2560 MHz channel of the plurality of 2560 MHz channels 408 may include eight contiguous 320 MHz channels 402.

In some demonstrative aspects, the mmWave channelization scheme 401 and/or the mmWave channelization scheme 403 may include any other additional or alternative mmWave channel widths, e.g., based on any other integer multiple of the minimal mmWave channel BW.

In some demonstrative aspects, the mmWave channelization scheme 401 and/or the mmWave channelization scheme

403 may include any other additional or alternative mmWave channel widths, e.g., different from and/or misaligned with the 2.16 GHz channels 405.

In some demonstrative aspects, the mmWave channelization scheme 401 and/or the mmWave channelization scheme 403 may include any other additional or alternative mmWave channel widths.

In some demonstrative aspects, the mmWave channelization scheme 401 and/or the mmWave channelization scheme 403 may be configured to implement one or more features, definitions, and/or functionalities, which may be compatible with a sub-10 GHz channelization scheme, e.g., as described below.

For example, a sub-7 GHz unlicensed band channelization, e.g., in accordance with one or more *IEEE* 802.11 *Specifications*, may utilize a minimum channel bandwidth of 20 MHz, and may include additional channel widths, for example, 40 MHz, 80 MHz, 160 MHz and/or 320 MHz, e.g., depending on the spectrum availability in a sub-7 GHz band, e.g., a 2.4 GHz band, a 5 GHz band, and/or a 6 GHz band.

In some demonstrative aspects, the mmWave channelization scheme 401 and/or the mmWave channelization scheme 403 may be configured to implement a plurality of specific coexistence scanning channels 407, e.g., as described below.

In some demonstrative aspects, as shown in FIG. 4, the plurality of coexistence scanning channels 407 may include one or more channels having a channel BW of 640 MHz, and centered at the center of each 2.16 GHz 11ad/ay channel of the plurality of 2.16 GHz 11ad/ay channels 405. For example, the coexistence scanning channels 407 may be configured to provide a technical solution to allow a device, e.g., device 102 (FIG. 1) and/or device 140 (FIG. 1), to perform scanning, e.g., specific scanning, to detect 11ad/ay operating devices, e.g., as described below.

In some demonstrative aspects, the mmWave channelization scheme 401 and/or the mmWave channelization scheme 403 may implement a plurality of 640 MHz channels 410, which may be included in a list of non-overlapping channels defined for WiFi8. For example, the plurality of coexistence scanning channels 407 may be defined to include one or more of the plurality of 640 MHz channels 410.

In some demonstrative aspects, as shown in FIG. 4, a 640 MHz channel of the plurality of 640 MHz channels 410 may fully overlap with a 2.16 GHz channel of the plurality of 2.16 GHz 11ad/ay channels 405.

In some demonstrative aspects, device 102 (FIG. 1) and/or device 140 (FIG. 1) may use the 640 MHz channel of the plurality of 640 MHz channels 410 as a coexistence scanning channel, for example, to perform scanning to detect 11ad/ay operating devices.

Referring back to FIG. 1, in some demonstrative aspects, device 102 and/or device 140 may communicate over the mmWave frequency band according to a mmWave channelization scheme (also referred to as "the non-2.16 GHz-based mmWave channelization scheme"), which may be based on mmWave channel widths different from the 2.16 GHz channel BW, and/or integer multiples of the 2.16 GHz channel BW.

In some demonstrative aspects, the non-2.16 GHz-based mmWave channelization scheme may include, or may be based on, the mmWave channelization scheme 401 (FIG. 4), the mmWave channelization scheme 403 (FIG. 4), and/or any other mmWave channelization scheme.

In some demonstrative aspects, the non-2.16 GHz-based mmWave channelization scheme may define a minimal mmWave channel width much larger than 20 MHz, such as, for example, a minimal mmWave channel width of 80 MHz, 160 MHz, 320 MHz, 640 MHz, and/or any other minimal channel width greater than 20 MHz, e.g., as described above.

In some demonstrative aspects, a mmWave channelization scheme, e.g., mmWave channelization scheme 401 (FIG. 4) and/or the mmWave channelization scheme 403 (FIG. 4), defined according to the minimal mmWave channel width, e.g., the minimal mmWave channel width of 80 MHz, 160 MHz or 320 MHz, may result in mmWave channels, which may be not aligned with channels that are used, e.g., currently, at 60 GHz, for example, 2.16 GHz channels 405 (FIG. 4) defined according to the *IEEE* 802.11*ad*/802.11*ay Specifications*, e.g., as shown in FIG. 4.

In some demonstrative aspects, device 102 and/or device 140 may communicate over the mmWave frequency band according to one or more coexistence rules, which may be configured to address a technical issue resulting from the channelization misalignment between the non-2.16 GHz-based mmWave channelization scheme, e.g., mmWave channelization scheme 401 (FIG. 4) and/or the mmWave channelization scheme 403 (FIG. 4), and the 2.16 GHz channels 405 (FIG. 4) according to the *IEEE* 802.11*ad*/802.11*ay Specifications.*

In some demonstrative aspects, device 102 and/or device 140 may communicate over the mmWave frequency band according to one or more coexistence rules, which may be configured to provide a technical solution to improve coexistence of 11ad/ay devices, e.g., devices communicating according to the *IEEE* 802.11*ad*/802.11*ay Specification*, with Wi-Fi 8 devices, e.g., devices communicating according to the non-2.16 GHz-based mmWave channelization scheme, e.g., mmWave channelization scheme 401 (FIG. 4) and/or the mmWave channelization scheme 403 (FIG. 4).

In some demonstrative aspects, the one or more coexistence rules may include a coexistence rule ("energy-detection-based coexistence rule"), which may be based on an energy detection mechanism, e.g., as described below.

In some demonstrative aspects, the one or more coexistence rules may include a coexistence rule ("scanning-based coexistence rule"), which may be based on a requirement that devices use scanning techniques on one or more channels, for example, channels, which may be defined, for example, as potentially social channels, e.g., as described below.

In some demonstrative aspects, the one or more coexistence rules may include a coexistence rule ("collocation-based coexistence rule"), which may be based on a collocation requirement for colocation of 60 GHz operation with lower band operation, e.g., as described below. For example, the 60 GHz operation may be managed through the lower band, for example, via signaling, e.g., as described below.

In some demonstrative aspects, the one or more coexistence rules may include a coexistence rule ("management-based coexistence rule"), which may be based on a managed operation, e.g., by a manager AP, in a particular location of operation, e.g., as described below.

In some demonstrative aspects, a first type of mmWave devices, e.g., devices operating according to the non-2.16 GHz-based mmWave channelization scheme, may implement an energy detection as a coexistence mechanism, e.g., a main coexistence mechanism, between the first type of mmWave devices and a second type of mmWave devices, e.g., devices operating according to the 2.16 GHz-based mmWave channelization scheme.

For example, the second type of mmWave devices may include devices, e.g., 11ad/ay devices, operating over an mmWave channelization utilizing 2.16 GHz channel widths, e.g., according to the *IEEE* 802.11*ad/ay Specifications.*

For example, the first type of devices may include devices, e.g., new Wi-Fi 8 devices, operating over a mmWave channelization utilizing channel widths which may be misaligned with the 2.16 GHz channel widths, e.g., as described below.

In some demonstrative aspects, an implementation of an energy detection mechanism as a coexistence mechanism for devices of the first mmWave type, e.g., device 102 and/or device 140, for coexistence with devices of the second mmWave type, may be different from some implementations, which may utilize both energy and packet detection for channel access. In one example, it may not be technically efficient to define a packet detection for channel access as a coexistence mechanism between the first and second types of mmWave devices, for example, since the second type of mmWave devices, e.g., the 11ad/ay devices, may not be able to decode a preamble of packets of the first type of mmWave devices, e.g., Wi-Fi 8 device preambles, and vice-versa. In another example, it may not be technically efficient to define a packet detection for channel access as a coexistence mechanism between the first and second types of mmWave devices, for example, since different channels may be used by PPDUs for the 11ad/ay devices and PPDUs for the Wi-Fi 8 devices.

In some demonstrative aspects, devices of the first mmWave type, e.g., device 102 and/or device 140, may implement a packet detection mechanism, which may be configured to support packet detection between devices of the first type of mmWave devices, e.g., between WiFi 8 devices. For example, a packet detection level may be defined and/or a PPDU preamble may be designed, for example, such that a Signal (SIG) field may be decoded on a minimal mmWave channel BW (basic BW) of 80 MHz, 160 MHz, 320 MHz, and/or any other basic BW, for example, even when a PPDU BW is larger than the basic BW. In one example, a first portion of the preamble of the PPDU may be duplicated, e.g., on each basic BW forming a PPDU BW, for example, such that an mmWave devices may be able to decode at least one of the duplicates over the basic BW.

In some demonstrative aspects, device 102 and/or device 140 may be configured to implement a coexistence mechanism, which may be configured to support a technical solution to improve coexistence between devices operating over the non-2.16 GHz-based channelization scheme, e.g., Wi-Fi 8 devices, and devices operating over the 2.16 GHz-based channelization scheme, e.g., 11ad/11ay devices, as described below.

In some demonstrative aspects, the coexistence mechanism may include forcing an mmWave device, e.g., an AP or a P2P device, which operates over the non-2.16 GHz-based channelization scheme, and which intends to establish a Basic Service Set (BSS) or a P2P link on a channel at 60 GHz, to perform one or more of the following actions:

Scan an entire BW using the non-2.16 GHz-based channelization scheme, e.g., a WiFi8 channelization. For example, the mmWave device may perform a scan over every 320 MHz channels forming the BW, every 640 MHz channels forming the BW, and/or any other basic BWs forming the BW.

Use a dedicated 11ad/ay sensing channelization made of the largest channel BW that is supported by a STA, e.g., centered at the center of the 11ad/ay 2.16 GHz channels.

Use at least one existing 640 MHz channel, e.g., channel 407 (FIG. 4), that is overlapping completely with an 11ad/ay 2.16 GHz channel for a 2.16 Ghz channel, e.g., for each 2.16 GHz channel. For example, the STA/AP may be forced to scan, for example, for at least a predefined duration, e.g., 100 ms or any other predefined duration, in each of these channels, for example, to identify whether an energy is detected above a certain level during a portion of the scanning time.

In some demonstrative aspects, controller 124 may be configured to cause a wireless communication device implemented by device 102 to determine an energy state of a 2.16 GHz channel BW in an mmWave wireless communication frequency band, for example, according to an energy detection mechanism, e.g., as described below.

In some demonstrative aspects, the mmWave wireless communication frequency band may include a 60 GHz frequency band.

In some demonstrative aspects, controller 124 may be configured to cause the wireless communication device implemented by device 102 to select between allowing or disabling the wireless communication device to transmit an mmWave PPDU over an mmWave wireless communication channel, for example, based on the energy state of the 2.16 GHz channel BW, e.g., as described below.

In some demonstrative aspects, the mmWave wireless communication channel may at least partially overlap the 2.16 GHz channel BW and may be different from the 2.16 GHz channel BW, e.g., as described below.

In some demonstrative aspects, the mmWave wireless communication channel may have an mmWave channel BW of at least 80 MHz.

In some demonstrative aspects, the mmWave channel BW of the mmWave wireless communication channel may be at least 160 MHz.

In other aspects, the mmWave channel BW of the mmWave wireless communication channel may include any other additional or alternative channel BW.

In some demonstrative aspects, controller 124 may be configured to cause the wireless communication device implemented by device 102 to select to allow the wireless communication device to transmit the mmWave PPDU over the mmWave wireless communication channel, for example, only when the 2.16 GHz channel BW is determined to have a free energy state.

In some demonstrative aspects, controller 124 may be configured to cause the wireless communication device implemented by device 102 to select to disable the wireless communication device to transmit the mmWave PPDU over the mmWave wireless communication channel, for example, when the 2.16 GHz channel BW is determined to have a busy energy state.

In some demonstrative aspects, controller 124 may be configured to cause the wireless communication device implemented by device 102 to determine the energy state of the 2.16 GHz channel BW, for example, based on energy detection scanning over one or more mmWave wireless communication channels, which are at least partially covered by the 2.16 GHz channel BW.

In some demonstrative aspects, controller 124 may be configured to cause the wireless communication device implemented by device 102 to determine the energy state of the 2.16 GHz channel BW, for example, based on energy detection scanning over a plurality of mmWave wireless communication channels, which are at least partially covered by the 2.16 GHz channel BW.

In some demonstrative aspects, controller 124 may be configured to cause the wireless communication device implemented by device 102 to determine the energy state of the 2.16 GHz channel BW, for example, based on energy detection scanning over all mmWave wireless communication channels defined according to an mmWave channelization scheme, which are at least partially covered by the 2.16 GHz channel BW.

For example, device 102 may determine the energy state of a 2.16 GHz channel BW 411 (FIG. 4), for example, based on energy detection scanning over all mmWave wireless communication channels 402 (FIG. 4), which are at least partially covered by the 2.16 GHz channel BW 411 (FIG. 4).

In some demonstrative aspects, controller 124 may be configured to cause the wireless communication device implemented by device 102 to determine the energy state of the 2.16 GHz channel BW, for example, based on energy detection over a largest mmWave wireless communication channel, which is supported by the wireless communication device, and which is entirely covered by the 2.16 GHz channel BW.

In one example, device 102 may determine the energy state of the 2.16 GHz channel BW 412 (FIG. 4), for example, based on energy detection scanning over an mmWave wireless communication channel 415, which is entirely covered by a 2.16 GHz channel BW 412 (FIG. 4), for example, if the mmWave wireless communication channel 415 is the largest BW supported by the device 102.

In some demonstrative aspects, controller 124 may be configured to cause the wireless communication device implemented by device 102 to determine the energy state of the 2.16 GHz channel BW, for example, based on energy detection over an mmWave wireless communication channel having a channel BW less than 2.16 Ghz, which is centered at a center of the 2.16 GHz channel BW.

For example, device 102 may determine the energy state of the 2.16 GHz channel BW 411 (FIG. 4), for example, based on energy detection scanning over an mmWave wireless communication channel 417 (FIG. 4), which is centered at a center of the 2.16 GHz channel BW 411 (FIG. 4).

In some demonstrative aspects, controller 124 may be configured to cause the wireless communication device implemented by device 102 to determine the energy state of the 2.16 GHz channel BW, for example, based on energy detection over an mmWave wireless communication channel, which is entirely covered by the 2.16 GHz channel BW, and which has an mmWave channel BW, which is equal to or greater than a predefined energy detection BW less than 2.16 GHz, e.g., as described above.

For example, device 102 may determine the energy state of the 2.16 GHz channel BW 411 (FIG. 4), for example, based on energy detection scanning over an mmWave wireless communication channel 419 (FIG. 4), which is entirely covered by the 2.16 GHz channel BW 411 (FIG. 4), and which has an mmWave channel BW of 640 MHz, for example, when the predefined energy detection BW is equal to or less than 640 MHz.

In some demonstrative aspects, the predefined energy detection BW may be 320 MHz.

In some demonstrative aspects, the predefined energy detection BW may be 640 MHz.

In other aspects, the predefined energy detection BW may include any other additional or alternative BW.

In some demonstrative aspects, the energy detection mechanism may be based on energy detection during an energy detection period, which is equal to or longer than a beacon period over the 2.16 GHz channel BW.

In some demonstrative aspects, controller 124 may be configured to cause the wireless communication device implemented by device 102 to determine the energy state of the 2.16 GHz channel BW, for example, according to an energy detection mechanism, which may be based on energy detection during an energy detection period of at least 100 milliseconds, e.g., as described above.

In other aspects, any other energy detection period may be utilized.

In some demonstrative aspects, controller 124 may be configured to cause the wireless communication device implemented by device 102 to determine the energy state of the 2.16 GHz channel BW, for example, based on a comparison between a detected energy over the 2.16 GHz channel BW and an energy detection threshold.

In some demonstrative aspects, controller 124 may be configured to cause the wireless communication device implemented by device 102 to select between allowing or disabling the wireless communication device to establish a link and/or a BSS over the mmWave wireless communication channel, for example, based on the energy state of the 2.16 GHz channel BW.

In some demonstrative aspects, an operational mode, e.g., a mandated operational mode or a preferred operational mode, may be defined for operation over the mmWave frequency band according to the non-2.16 GHz-based mmWave channelization scheme, e.g., as described below.

In some demonstrative aspects, the operational mode may define that a device, e.g., device 102 and/or device 140, which implements a mmWave device, e.g., which operates according to the non-2.16 GHz-based mmWave channelization scheme, is to be collocated with an AP operating over the sub-10 Ghz band, e.g., as described below.

For example, a mandated or preferred operational mode may be defined, where a new 11ay/ay 60 GHz AP, a new Wi-Fi 8 device operating at 60 GHz, and/or any other device, e.g., 60 GHz radars, is required to be collocated with an AP in a lower band, e.g., at 2.4 GHz, 5 GHz or any other lower band, and/or in a dedicated social channel, e.g., at 2.4 GHz.

In some demonstrative aspects, the collocated AP may be configured to transmit beacons and/or probe response frames including a Reduced Neighbor Report (RNR) element with a Target Beacon Transmission Time (TBTT) Information field describing the AP operating at the 60 GHz band, e.g., as described below.

In one example, the TBTT Information field may include a description of an operating class of the collocated AP. In one example, the TBTT Information field may include a channel number corresponding to the mmWave channel on which the collocated AP operates at 60 GHz. In another example, the TBTT Information field may include any other additional or alternative information describing the collocated AP.

In some demonstrative aspects, an Operating Bandwidth field may be included in the RNR, e.g., to support the information describing the collocated AP, e.g., in addition to a configuration of the RNR to point to the primary channel.

In some demonstrative aspects, the collocated AP may set a TBTT offset field to identify a beacon frame, which is transmitted in an omni mode or using a sector sweep, if any.

In other aspects, a neighbor AP that is not collocated may be, e.g., should be, the one including an RNR for a 60 GHz AP, for example, when the 60 GHz AP does not have a collocated AP at 2.4 GHz.

In some demonstrative aspects, the RNR may include any other additional or alternative fields, which may be configured to better describe what type of network is being utilized at 60 GHz, e.g., as described below.

In one example, the RNR may be configured to include a field to identify a standard version, e.g., a field including a name of the standard, e.g., 11ad, 11ay, and/or Wi-Fi 8, which is being utilized for communication at 60 GHz.

In one example, the RNR may include a field indicating a type of a device, e.g., a radar.

In another example, the RNR may include any other additional or alternative type of fields and/or parameters to describe a waveform or pulse frequency, and/or characteristics of the 60 GHz device, for example, in case of radars.

In some demonstrative aspects, device 102 and/or device 140 may be configured to implement a de-centralized scheme, for example, to manage communication of mmWave PPDUs according to the non-2.16 GHz-based mmWave channelization scheme, for example, according to the mmWave channelization scheme 401 (FIG. 4) and/or the mmWave channelization scheme 403 (FIG. 4), e.g., as described below.

In some demonstrative aspects, the de-centralized scheme may require that a device operating over the 60 GHz band, e.g., each device operating at 60 GHz, would be responsible to advertise on its own its operation at 60 GHz.

In some demonstrative aspects, the device operating over the 60 GHz band may be required to communicate a signal in a lower band, e.g., an IEEE 802.11 signal in a sub-10 GHz band, to signal this advertisement of the operation at 60 GHz.

In some demonstrative aspects, the device operating over the 60 GHz band may be configured to signal this advertisement of the operation at 60 GHz via any other additional or alternative mechanism, e.g., via Bluetooth signals or the like.

In some demonstrative aspects, the de-centralized scheme may define that a device operating over the 60 GHz band is to advertise in a lower band, for example, the sub-10 Ghz band, e.g., in the region where it operates, that the device is operating at the 60 GHz band.

In some demonstrative aspects, the de-centralized scheme may define that the device operating over the 60 GHz band is to advertise in the lower band information to describe one or more characteristics, e.g., the basic characteristics, of the operation over the 60 GHz band.

In some demonstrative aspects, it may be mandated that an AP and/or a P2P device, which is to establish a BSS and/or a P2P link on a channel at 60 GHz, is to be required to first perform a scan, e.g., a mandatory scan, of a lower band, e.g., the sub-10 GHz band, for example, in order to detect if there are 60 GHz networks, e.g., 11ad/ay/Wi-Fi8/ radars networks, that are currently operating at 60 GHz and on which channel.

In some demonstrative aspects, the AP and/or the P2P device may be mandated to perform a full scan of the lower band. In other aspects, the AP and/or the P2P device may be allowed to perform a partial scan of the lower band.

In one example, the AP and/or the P2P device may be mandated to perform the scan over at least a social channel in the lower band, e.g., a social channel at the 2.4 GHz band. In another example, the AP and/or the P2P device may be mandated perform the scan over any other additional or alternative channel in the lower band.

In some demonstrative aspects, the AP and/or the P2P device may perform the scan of the lower band, for example, by using passive scanning. In other aspects, the AP and/or the P2P device may perform the scan of the lower band, for example, by using active scanning.

In some demonstrative aspects, the AP and/or the P2P device may perform the active scanning, for example, using a wildcard probe request. In other aspects, the AP and/or the P2P device may perform the active scanning using any other additional or alternative mechanism.

In some demonstrative aspects, if any APs are discovered during the scan over the 60 GHz band, the AP or the P2P device may be required to avoid operating on one or more channels, e.g. any channels, which at least partially overlap with the channel used by the 60 GHz channel.

In some demonstrative aspects, if any APs are discovered during the scan over an 11ad/ay channel in the 60 GHz band, the AP or the P2P device may be required to perform a specific scan on a coexistence channel, for example, over a coexistence channel that is centered at the center of the 11ad/ay channel. For example, the AP or the P2P device may be required to perform the specific scan and using a widest BW that the mmWave STA of the AP/P2P device supports.

In some demonstrative aspects, controller 124 may be configured to cause a wireless communication device implemented by device 102 to transmit over a sub 10-GHz wireless communication channel information relating to communications to be performed by the wireless communication device over an mmWave wireless communication channel, e.g., as described below.

In some demonstrative aspects, controller 124 may be configured to cause the wireless communication device implemented by device 102 to generate an information element including mmWave channel information, e.g., as described below.

In some demonstrative aspects, the mmWave channel information may be configured to identify an mmWave wireless communication channel in an mmWave wireless communication frequency band, e.g., as described below.

In some demonstrative aspects, the information element may include version information configured to identify an mmWave PPDU version of a PPDU to be communicated over the mmWave wireless communication channel, e.g., as described below.

In some demonstrative aspects, the mmWave wireless communication frequency band may include a 60 GHz frequency band.

In some demonstrative aspects, controller 124 may be configured to cause the wireless communication device implemented by device 102 to transmit a frame over a sub-10 GHz wireless communication channel, e.g., as described below.

In some demonstrative aspects, the frame may include the information element, e.g., including the mmWave channel information and the version information.

In some demonstrative aspects, the frame may include a beacon.

In some demonstrative aspects, the frame may include a probe response.

In other aspects, the frame may include any other additional or alternative type of frame.

In some demonstrative aspects, the sub-10 GHz wireless communication channel may include a channel in a 2.4 GHz wireless communication frequency band, a channel in a 5 GHz wireless communication frequency band, and/or a channel in a 6 GHz wireless communication frequency band.

In some demonstrative aspects, the wireless communication device implemented by device 102 may include an MLD including a first STA to communicate over the mmWave wireless communication channel, and a second STA to communicate over the sub-10 GHz wireless communication channel, e.g., as described above. For example, the wireless communication device implemented by device 102 may include an AP MLD including an mmWave STA 141 to communicate over the mmWave wireless communication channel, and AP 135 to communicate over the sub-10 GHz wireless communication channel, e.g., as described above.

In some demonstrative aspects, controller 154 may be configured to cause a wireless communication device implemented by device 140 to process an information element in a frame received over a sub-10 GHz wireless communication channel.

For example, a wireless communication device, e.g., device 140, process an information element in a frame received from another wireless communication device, e.g., the frame transmitted by device 102, over the sub-10 GHz wireless communication channel.

In some demonstrative aspects, the mmWave channel information in the information element may be configured to identify an active mmWave wireless communication channel in the mmWave wireless communication frequency band.

In some demonstrative aspects, controller 154 may be configured to cause the wireless communication device implemented by device 140 to disable the wireless communication device to communicate over an mmWave wireless communication channel, which at least partially overlaps the active mmWave wireless communication channel, for example, based on the mmWave channel information.

In some demonstrative aspects, the wireless communication device implemented by device 140 may include an MLD including a first STA to communicate over the mmWave wireless communication channel, and a second STA to communicate over the sub-10 GHz wireless communication channel, e.g., as described above. For example, the wireless communication device implemented by device 140 may include a non-AP MLD including mmWave STA 161 to communicate over the mmWave wireless communication channel, and STA 155 to communicate over the sub-10 GHz wireless communication channel, e.g., as described above.

In some demonstrative aspects, the mmWave channel information communicated in the frame transmitted by device 102 and/or in the frame received by device 140 may be configured to indicate a central frequency of the mmWave wireless communication channel identified by the mmWave channel information.

In some demonstrative aspects, the mmWave channel information communicated in the frame transmitted by device 102 and/or in the frame received by device 140 may be configured to indicate a bandwidth of the mmWave wireless communication channel identified by the mmWave channel information.

In some demonstrative aspects, the mmWave channel information communicated in the frame transmitted by device 102 and/or in the frame received by device 140 may be configured to include an operating class of the mmWave wireless communication channel identified by the mmWave channel information.

In some demonstrative aspects, the mmWave channel information communicated in the frame transmitted by device 102 and/or in the frame received by device 140 may be configured to include a channel number of the mmWave wireless communication channel identified by the mmWave channel information.

In some demonstrative aspects, the mmWave channel information communicated in the frame transmitted by device 102 and/or in the frame received by device 140 may be configured to indicate any other additional or alternative information corresponding to the mmWave wireless communication channel identified by the mmWave channel information.

In some demonstrative aspects, the frame transmitted by device 102 and/or in the frame received by device 140 may be configured to include a neighbor report element including the information element including the mmWave channel information and the version information.

In some demonstrative aspects, the neighbor report element may include a reduced neighbor report element including a TBTT information field.

In some demonstrative aspects, the TBTT information field may include the information element including the mmWave channel information and the version information.

In some demonstrative aspects, controller 124 may be configured to cause the wireless communication device implemented by device 102 to set a TBTT offset field in the reduced neighbor report element, for example, to identify a beacon frame transmitted over the mmWave wireless communication channel.

In some demonstrative aspects, controller 154 may be configured to cause the wireless communication device implemented by device 140 to process the TBTT offset field in the reduced neighbor report element, for example, to identify a beacon frame transmitted over the mmWave wireless communication channel.

In some demonstrative aspects, the information element in the frame transmitted by device 102 and/or in the frame received by device 140 may be configured to include a version field including, for example, a predefined version value to identify the mmWave PPDU version of the PPDU to be communicated over the mmWave wireless communication channel identified by the information element, e.g., as described above.

In some demonstrative aspects, the version information in the information element in the frame transmitted by device 102 and/or in the frame received by device 140 may include a predefined version value from a plurality of predefined version values corresponding, for example, to a respective plurality of mmWave PPDU versions.

In some demonstrative aspects, the plurality of predefined version values may include a version value, e.g., a first version value corresponding, for example, to an mmWave PPDU version configured for an integer multiple of a 2.16 GHz channel BW. For example, the first version value may correspond, for example, to an mmWave PPDU version configured for communication according to a 2.16-based mmWave channelization scheme, for example, according to the *IEEE* 802.11*ad/ay Specifications*, e.g., as described above.

In some demonstrative aspects, the plurality of predefined version values may include a version value, e.g., a second version value, corresponding, for example, to an mmWave PPDU version configured for an mmWave channel BW of at least 80 MHz, which is different from the 2.16 GHz channel BW. For example, the first version value may correspond, for example, to an mmWave PPDU version configured for communication according to a non-2.16-based mmWave channelization scheme, for example, according to the mmWave channelization scheme 401 (FIG. 4) and/or the mmWave channelization scheme 403 (FIG. 4), e.g., as described above.

In some demonstrative aspects, device 102 and/or device 140 may be configured to implement a centralized scheme, for example, to manage communication of mmWave PPDUs according to the non-2.16 GHz-based mmWave channelization scheme, for example, according to the mmWave channelization scheme 401 (FIG. 4) and/or the mmWave channelization scheme 403 (FIG. 4), e.g., as described below.

In some demonstrative aspects, the centralized scheme may be implemented by an infrastructure set of APs, e.g., including APs implemented by device 102 and/or device 140, to collect network location information of networks that are operating over the 60 GHz band, for example, in a particular location, e.g., as described below.

In one example, infrastructure set of APs may be implemented as part of an enterprise network in the premises of an enterprise.

In some demonstrative aspects, the infrastructure set of APs may be configured to advertise the network location information to one or more other STAs/APs in a neighborhood, for example, in a broadcast manner and/or upon request, e.g., as described below.

In some demonstrative aspects, the infrastructure set of APs may be configured to recommend to a STA/AP, which wants to establish a BSS over the 60 GHz band, a set of recommended channels, which may be used for operation in the 60 GHz band. For example, the set of recommended channels may be determined and/or identified based, for example, on location information provided by the STA, and/or based on location information of the STA, which may be estimated by one or more AP(s) of the infrastructure set of APs.

In some demonstrative aspects, the one or more APs of the infrastructure set of APs may be configured to operate as, and/or perform one or more functionalities of, local database APs.

In some demonstrative aspects, the local database APs may be configured to offer a service of assisting coexistence over the 60 GHz band, for example, by collecting information on existing networks and assisting new STAs/APs who wish to operate over the 60 GHz band, e.g., as described below.

In some demonstrative aspects, the local database APs may be configured to implement one or more AP database functionalities and/or operations, for example, similar to a database used for 6 GHz Automated Frequency Coordination (AFC) operation.

In some demonstrative aspects, an AP of the infrastructure set of APs may be configured to advertise, e.g., in its beacons/probe responses and/or in any other messages, that the AP is part of the infrastructure set of APs, e.g., the local database APs.

In some demonstrative aspects, a STA/AP, which is operating at 60 GHz and/or which has a STA/AP affiliated with a same MLD operating at 60 GHz, may provide the local database APs with information corresponding to the operation of the AP/STA over the 60 GHz band. For example, the AP/STA may provide the local database APs information relating to of an operating channel at the 60 GHz band, a BW of operation at the 60 GHz band, a transmit power at the 60 GHz band, localization information of the AP/STA, and/or any other additional or alternative information. For example, the STA/AP may provide to the local database APs radar information, information defined in accordance with the *IEEE* 802.11*ad/ay Specifications*, and/or a WiFi8 Specification. For example, the STA/AP may provide to the local database APs any other additional or alternative, e.g., useful, characteristics, for example, information relating to whether a link is a P2P link or a link used by an AP serving multiple clients in all directions, a channel usage characteristic, and/or any other additional or alternative characteristics.

In some demonstrative aspects, an AP of the infrastructure set of APs may update the local database with the information on a 60 GHz AP at the particular location, for example, based on the information provided by the STA/AP operating at 60 GHz.

In some demonstrative aspects, a local database AP of the infrastructure set of APs may be able to advertise, e.g., in its beacon, probe response frames, and/or any other messages, that the AP is connected to the local database and may provide database service for managing access to the 60 GHz band.

In some demonstrative aspects, the local database AP of the infrastructure set of APs may be able to respond to a request for a report at 60 GHz in a particular location, for example, by providing a report on the list of APs operating at 60 GHz near a particular location. In one example, the report may include some or all of the known characteristics that are in the local database for these APs.

For example, the local database may be configured to calculate, e.g., using basic path loss tools and/or any other tools, a probability that a neighbor AP may be received/interfered in a particular location.

In some demonstrative aspects, a 60 GHz database information request frame may be defined to contain a requested localization for a STA/AP (requester STA/AP). For example, the local database may assume that the 60 GHz database information request is for a STA in the range of the AP receiving the request frame, for example, when no localization information is provided by the STA.

In some demonstrative aspects, the 60 GHz database information request may be configured to include information about one or more parameters that are intended to be used by the STA/AP at the 60 GHz band. For example, the 60 GHz database information request may include a BW of operation, a standard type, a transmit power, and/or any other additional or alternative parameters intended to be used by the requesting STA/AP over the 60 GHz band.

In some demonstrative aspects, the local database may provide to the ST/AP a 60 GHz database information report frame, which may be configured to include, for example, a per-AP profile, e.g., for each reported AP that may operate at the 60 GHz band in the neighborhood, e.g., as may be known to the local database. For example, the per-AP profile may include fields and/or elements for each of the parameters that the local database knows about these APs.

In some demonstrative aspects, the 60 GHz database information report may include a recommendation for a channel and/or a set of channels at the 60 GHz band. For example, the recommendation for the 60 GHz channel may be derived by the local database, for example, based on the information stored in the local database and/or the information provided by the requester STA/AP.

In some demonstrative aspects, the requester STA/AP that wants to operate at the 60 GHz band may request a report from the local database. For example, the requester STA/AP may send the request for the report in the lower band, e.gm, the sub-10 Ghz band, in its location, for example, before using a particular channel at 60 GHz. For example, the requester STA/AP may take into account the information from the local database for its operation over the 60 GHz band.

In some demonstrative aspects, the STA/AP may inform the local database of its operation parameters, for example, once the STA/AP starts to operate at the 60 GHz band.

Figure 5:
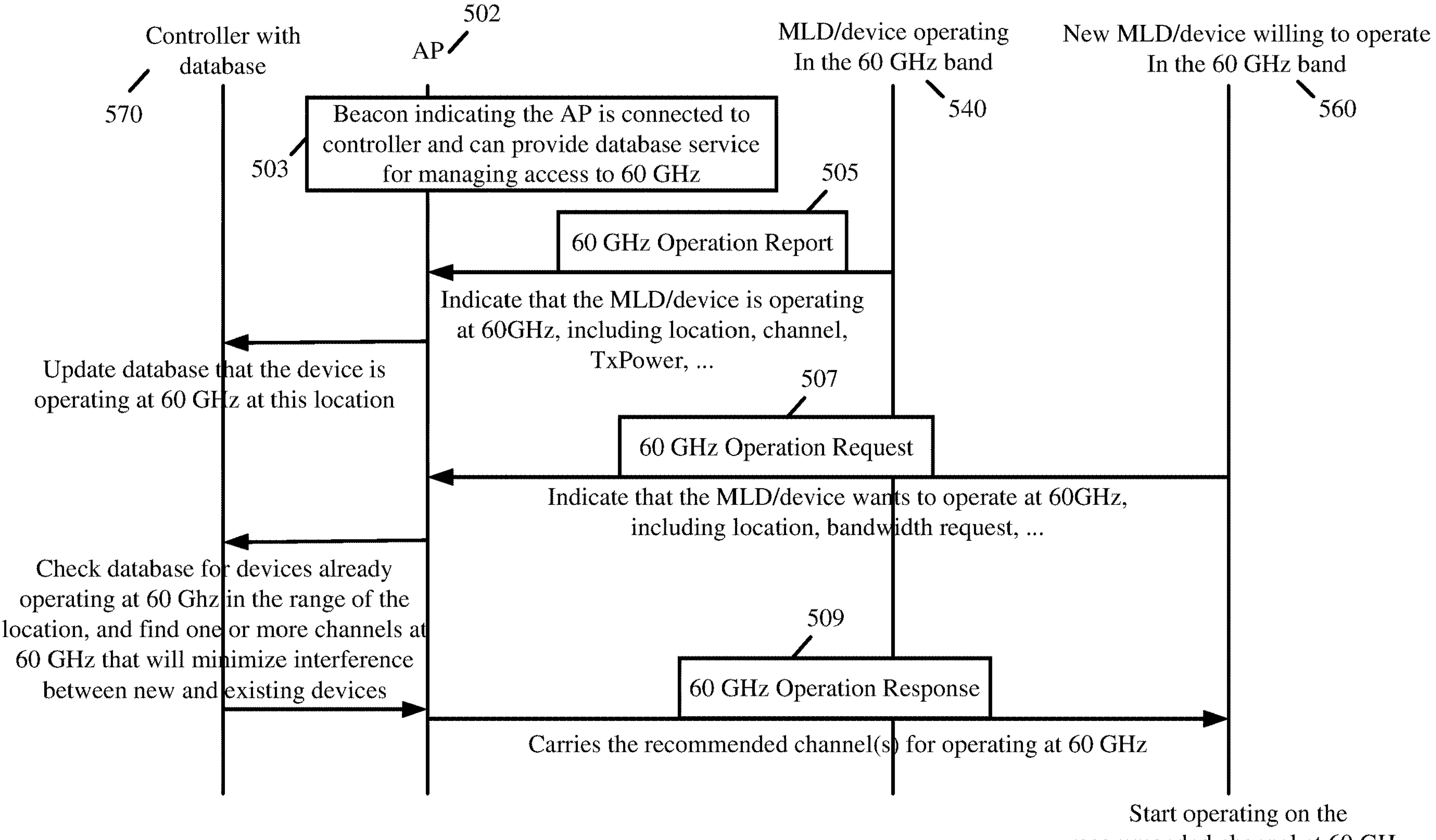
FIG. 5 is a schematic illustration of communications according to a centralized management scheme to manage communication over mmWave channels, in accordance with some demonstrative aspects.

Reference is made to FIG. 5, which schematically illustrates communications according to a centralized management scheme 500 to manage communication over mmWave channels, in accordance with some demonstrative aspects.

In some demonstrative aspects, as shown in FIG. 5, one or more operations of the centralized management scheme 500 may be performed by a controller database 570, an AP 502, a device/MLD 540 operating on the mmWave band, and/or a device/MLD 560 intending to operate over the mmWave band.

For example, a database 170 (FIG. 1) may perform one or more operations of, one or more functionalities of, the role of, and/or the functionality of, controller database 570.

For example, device 102 (FIG. 1) may perform one or more operations of, one or more functionalities of, the role of, and/or the functionality of, AP 502.

For example, device 140 (FIG. 1) may perform one or more operations of, one or more functionalities of, the role of, and/or the functionality of, device/MLD 540.

For example, a device 160 (FIG. 1) may perform one or more operations of, one or more functionalities of, the role of, and/or the functionality of, device/MLD 560.

In some demonstrative aspects, AP 502 may provide database services for managing access to the 60 GHz band, e.g., as described below.

In some demonstrative aspects, AP 502 may provide database services for managing access to the 60 GHz band, for example, when AP 502 is connected to, and/or includes, controller database 570.

In some demonstrative aspects, as shown in FIG. 5, AP 502 may transmit a beacon 503 to indicate, for example, that AP 502 is connected to controller database 570 and is capable of providing the service for managing access to the 60 GHz band.

In some demonstrative aspects, as shown in FIG. 5, device/MLD 540 may transmit to AP 502 a message 505 including a 60 GHz operation report.

In some demonstrative aspects, as shown in FIG. 5, message 505 may indicate that device/MLD 540 is operating at the 60 GHz band. For example, message 505 may include information pertaining to a location of device/MLD 540, a channel device/MLD 540 is operating on, a Tx power level implemented by device/MLD 540, and/or any other additional or alternative information.

In some demonstrative aspects, as shown in FIG. 5, AP 502 may update controller database 570, for example, based on the 60 GHz operation report in message 505 from device/MLD 540.

For example, AP 502 may update controller database 570 with the location of device/MLD 540, which is operating at the 60 GHz band.

In some demonstrative aspects, device/MLD 560 may intend to operate at the 60 GHz band.

In some demonstrative aspects, as shown in FIG. 5, device/MLD 560 may transmit to AP 502 a message 507 including a 60 GHz operation request.

In some demonstrative aspects, as shown in FIG. 5, message 507 may indicate that device/MLD 560 is requesting to operate at the 60 GHz band. For example, message 507 may include information pertaining to a location of device/MLD 560, a bandwidth request, and/or any other additional or alternative information and/or requests.

In some demonstrative aspects, as shown in FIG. 5, AP 502 may check for information with controller database 570 for information, for example, based on the request message 507 from device/MLD 560.

In some demonstrative aspects, AP 502 may check controller database 570 for devices already operating at the 60 GHz band, for example, in a range of the location of device/MLD 560.

In some demonstrative aspects, AP 502 may find one or more channels at the 60 GHz band, which may minimize interference between device/MLD 560 and one or more other devices already operating at the 60 GHz band, e.g., MLD/device 540.

In some demonstrative aspects, as shown in FIG. 5, AP 502 may send to device 560 a message 509 including a 60 GHz operation response. For example, AP 502 may send message 509, for example, based on the check for information with controller database 570.

In some demonstrative aspects, as shown in FIG. 5, message 509 may include a recommended channel for the device/MLD 560 to operate at the 60 GHz band.

In some demonstrative aspects, as shown in FIG. 5, device/MLD 560 may start operating on the recommended channel at the 60 GHz band, for example, based on message 509 from AP 502.

Figure 6:
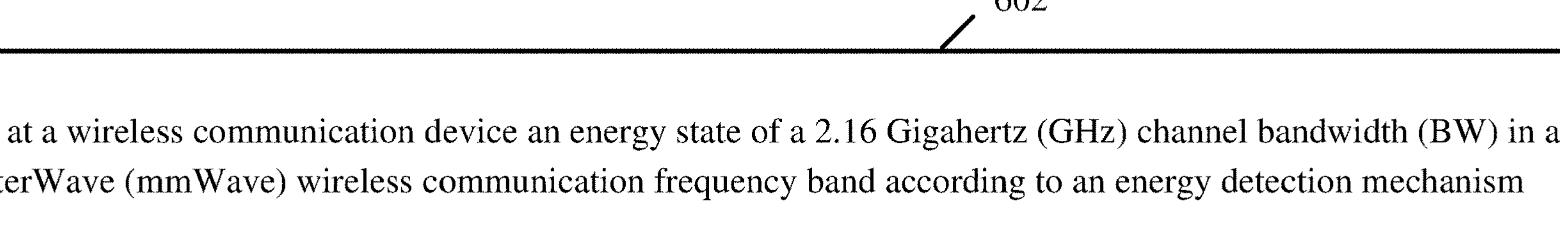
FIG. 6 is a schematic flow-chart illustration of a method of communicating an mmWave Physical layer (PHY) Protocol Data Unit (PPDU) over an mmWave wireless communication channel, in accordance with some demonstrative aspects.

Reference is made to FIG. 6, which schematically illustrates a method of communicating an mmWave PPDU over an mmWave wireless communication channel, in accordance with some demonstrative aspects. For example, one or more of the operations of the method of FIG. 6 may be performed by one or more elements of a system, e.g., system 100 (FIG. 1), for example, one or more wireless devices, e.g., device 102 (FIG. 1), and/or device 140 (FIG. 1), an MLD, e.g., MLD 131 (FIG. 1) and/or MLD 151 (FIG. 1), a controller, e.g., controller 124 (FIG. 1) and/or controller 154 (FIG. 1), a radio, e.g., radio 114 (FIG. 1) and/or radio 144 (FIG. 1), and/or a message processor, e.g., message processor 128 (FIG. 1) and/or message processor 158 (FIG. 1).

As indicated at block 602, the method may include determining at a wireless communication device an energy state of a 2.16 GHz channel BW in an mmWave wireless communication frequency band according to an energy detection mechanism. For example, controller 124 (FIG. 1) may be configured to cause, trigger, and/or control device 102 (FIG. 1) to determine the energy state of the 2.16 GHz channel BW in the mmWave wireless communication frequency band according to the energy detection mechanism, e.g., as described above.

As indicated at block 604, the method may include selecting, for example, based on the energy state of the 2.16 GHz channel BW, between allowing or disabling the wireless communication device to transmit an mmWave PPDU over an mmWave wireless communication channel. For example, the mmWave wireless communication channel may at least partially overlap the 2.16 GHz channel BW and may be different from the 2.16 GHz channel BW. For example, the mmWave wireless communication channel may have an mmWave channel BW of at least 80 MHz. For example, controller 124 (FIG. 1) may be configured to cause, trigger, and/or control device 102 (FIG. 1) to select, based on the energy state of the 2.16 GHz channel BW, between allowing or disabling device 102 (FIG. 1) to transmit the mmWave PPDU over the mmWave wireless communication channel, e.g., as described above.

Reference is made to FIG. 7, which schematically illustrates a method of communicating an mmWave PPDU over an mmWave wireless communication channel, in accordance with some demonstrative aspects. For example, one or more of the operations of the method of FIG. 7 may be performed by one or more elements of a system, e.g., system 100 (FIG. 1), for example, one or more wireless devices, e.g., device 102 (FIG. 1) and/or device 140 (FIG. 1), an MLD, e.g., MLD 131 (FIG. 1) and/or MLD 151 (FIG. 1), a controller, e.g., controller 124 (FIG. 1) and/or controller 154 (FIG. 1), a radio, e.g., radio 114 (FIG. 1) and/or radio 144

(FIG. 1), and/or a message processor, e.g., message processor 128 (FIG. 1) and/or message processor 158 (FIG. 1).

As indicated at block 702, the method may include generating at a wireless communication device an information element including mmWave channel information to identify an mmWave wireless communication channel in a mmWave wireless communication frequency band, and version information to identify an mmWave PPDU version of a PPDU to be communicated over the mmWave wireless communication channel. For example, controller 124 (FIG. 1) may be configured to cause, trigger, and/or control device 102 (FIG. 1) to generate the information element including the mmWave channel information to identify the mmWave wireless communication channel in the mmWave wireless communication frequency band, and version information to identify the mmWave PPDU version of a PPDU to be communicated by device 102 (FIG. 1) over the mmWave wireless communication channel, e.g., as described above.

As indicated at block 704, the method may include transmitting over a sub-10 GHz wireless communication channel a frame including the information element including the mmWave channel information and the version information. For example, controller 124 (FIG. 1) may be configured to cause, trigger, and/or control device 102 (FIG. 1) to transmit the frame including the information element including the mmWave channel information and the version information over the sub-10 GHz wireless communication channel, e.g., as described above.

Figure 8:
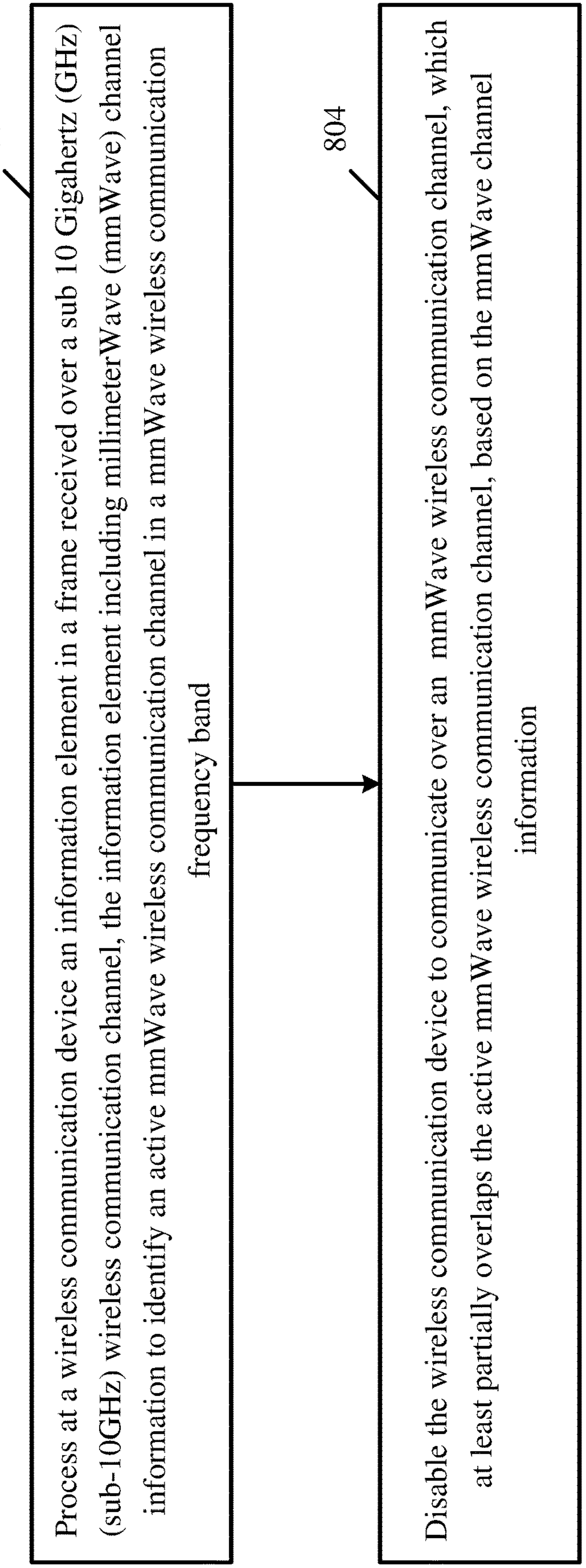
FIG. 8 is a schematic flow-chart illustration of a method of communicating an mmWave PPDU over an mmWave wireless communication channel, in accordance with some demonstrative aspects.

Reference is made to FIG. 8, which schematically illustrates a method of communicating an mmWave PPDU over an mmWave wireless communication channel, in accordance with some demonstrative aspects. For example, one or more of the operations of the method of FIG. 8 may be performed by one or more elements of a system, e.g., system 100 (FIG. 1), for example, one or more wireless devices, e.g., device 102 (FIG. 1) and/or device 140 (FIG. 1), an MLD, e.g., MLD 131 (FIG. 1) and/or MLD 151 (FIG. 1), a controller, e.g., controller 124 (FIG. 1) and/or controller 154 (FIG. 1), a radio, e.g., radio 114 (FIG. 1) and/or radio 144 (FIG. 1), and/or a message processor, e.g., message processor 128 (FIG. 1) and/or message processor 158 (FIG. 1).

As indicated at block 802, the method may include processing at a wireless communication device an information element in a frame received over a sub-10 GHz wireless communication channel. For example, the information element may include mmWave channel information to identify an active mmWave wireless communication channel in a mmWave wireless communication frequency band. For example, controller 154 (FIG. 1) may be configured to cause, trigger, and/or control device 140 (FIG. 1) to process the information element in the frame received over the sub-10 GHz wireless communication channel, e.g., as described above.

As indicated at block 804, the method may include, based on the mmWave channel information, disabling the wireless communication device to communicate over an mmWave wireless communication channel, which at least partially overlaps the active mmWave wireless communication channel. For example, controller 154 (FIG. 1) may be configured to cause, trigger, and/or control device 140 (FIG. 1) to, based on the mmWave channel information, disable device 140 (FIG. 1) to communicate over the mmWave wireless communication channel, which at least partially overlaps the active mmWave wireless communication channel, e.g., as described above.

Figure 9:
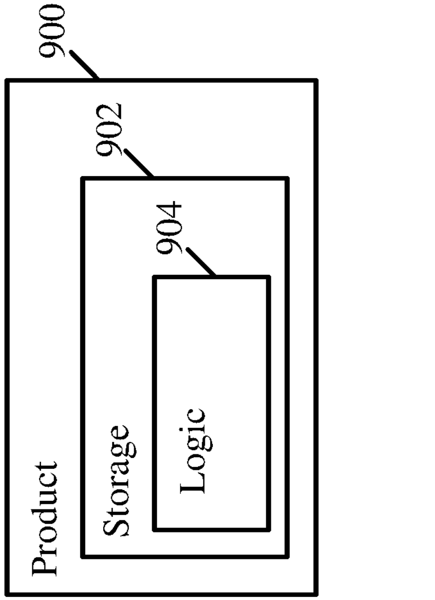
FIG. 9 is a schematic illustration of a product of manufacture, in accordance with some demonstrative aspects.

Reference is made to FIG. 9, which schematically illustrates a product of manufacture 900, in accordance with some demonstrative aspects. Product 900 may include one or more tangible computer-readable ("machine-readable") non-transitory storage media 902, which may include computer-executable instructions, e.g., implemented by logic 904, operable to, when executed by at least one computer processor, enable the at least one computer processor to implement one or more operations at device 102 (FIG. 1), device 140 (FIG. 1), MLD 131 (FIG. 1), MLD 151 (FIG. 1), radio 114 (FIG. 1), radio 144 (FIG. 1), transmitter 118 (FIG. 1), transmitter 148 (FIG. 1), receiver 116 (FIG. 1), receiver 146 (FIG. 1), message processor 128 (FIG. 1), message processor 158 (FIG. 1), controller 124 (FIG. 1), and/or controller 154 (FIG. 1); to cause device 102 (FIG. 1), device 140 (FIG. 1), MLD 131 (FIG. 1), MLD 151 (FIG. 1), radio 114 (FIG. 1), radio 144 (FIG. 1), transmitter 118 (FIG. 1), transmitter 148 (FIG. 1), receiver 116 (FIG. 1), receiver 146 (FIG. 1), message processor 128 (FIG. 1), message processor 158 (FIG. 1), controller 124 (FIG. 1), and/or controller 154 (FIG. 1), to perform, trigger and/or implement one or more operations and/or functionalities; and/or to perform, trigger and/or implement one or more operations and/or functionalities described with reference to the FIGS. 1, 2, 3, 4, 5, 6, 7, and/or 8, and/or one or more operations described herein. The phrases "non-transitory machine-readable medium" and "computer-readable non-transitory storage media" may be directed to include all machine and/or computer readable media, with the sole exception being a transitory propagating signal.

In some demonstrative aspects, product 900 and/or machine-readable storage media 902 may include one or more types of computer-readable storage media capable of storing data, including volatile memory, non-volatile memory, removable or non-removable memory, erasable or non-erasable memory, writeable or re-writeable memory, and the like. For example, machine-readable storage media 902 may include, RAM, DRAM, Double-Data-Rate DRAM (DDR-DRAM), SDRAM, static RAM (SRAM), ROM, programmable ROM (PROM), erasable programmable ROM (EPROM), electrically erasable programmable ROM (EEPROM), flash memory (e.g., NOR or NAND flash memory), content addressable memory (CAM), polymer memory, phase-change memory, ferroelectric memory, silicon-oxide-nitride-oxide-silicon (SONOS) memory, a disk, a hard drive, and the like. The computer-readable storage media may include any suitable media involved with downloading or transferring a computer program from a remote computer to a requesting computer carried by data signals embodied in a carrier wave or other propagation medium through a communication link, e.g., a modem, radio or network connection.

In some demonstrative aspects, logic 904 may include instructions, data, and/or code, which, if executed by a machine, may cause the machine to perform a method, process and/or operations as described herein. The machine may include, for example, any suitable processing platform, computing platform, computing device, processing device, computing system, processing system, computer, processor, or the like, and may be implemented using any suitable combination of hardware, software, firmware, and the like.

In some demonstrative aspects, logic 904 may include, or may be implemented as, software, a software module, an application, a program, a subroutine, instructions, an instruction set, computing code, words, values, symbols, and the like. The instructions may include any suitable type of code, such as source code, compiled code, interpreted code, executable code, static code, dynamic code, and the like. The instructions may be implemented according to a predefined computer language, manner or syntax, for instructing a processor to perform a certain function. The instructions may be implemented using any suitable high-level, low-level, object-oriented, visual, compiled and/or interpreted programming language, machine code, and the like.

EXAMPLES

The following examples pertain to further aspects.

Example 1 includes an apparatus comprising logic and circuitry configured to cause a wireless communication device to determine an energy state of a 2.16 Gigahertz (GHz) channel bandwidth (BW) in a millimeterWave (mmWave) wireless communication frequency band according to an energy detection mechanism; and based on the energy state of the 2.16 GHz channel BW, select between allowing or disabling the wireless communication device to transmit an mmWave Physical layer (PHY) Protocol Data Unit (PPDU) over an mmWave wireless communication channel, which at least partially overlaps the 2.16 GHz channel BW and is different from the 2.16 GHz channel BW, the mmWave wireless communication channel having an mmWave channel BW of at least 80 Megahertz (MHz).

Example 2 includes the subject matter of Example 1, and optionally, wherein the apparatus is configured to cause the wireless communication device to determine the energy state of the 2.16 GHz channel BW based on energy detection over one or more mmWave wireless communication channels, which are at least partially covered by the 2.16 GHz channel BW.

Example 3 includes the subject matter of Example 1 or 2, and optionally, wherein the apparatus is configured to cause the wireless communication device to determine the energy state of the 2.16 GHz channel BW based on energy detection scanning over a plurality of mmWave wireless communication channels, which are at least partially covered by the 2.16 GHz channel BW.

Example 4 includes the subject matter of any one of Examples 1-3, and optionally, wherein the apparatus is configured to cause the wireless communication device to determine the energy state of the 2.16 GHz channel BW based on energy detection scanning over all mmWave wireless communication channels defined according to an mmWave channelization scheme, which are at least partially covered by the 2.16 GHz channel BW.

Example 5 includes the subject matter of any one of Examples 1-4, and optionally, wherein the apparatus is configured to cause the wireless communication device to determine the energy state of the 2.16 GHz channel BW based on energy detection over a largest mmWave wireless communication channel, which is supported by the wireless communication device, and which is entirely covered by the 2.16 GHz channel BW.

Example 6 includes the subject matter of any one of Examples 1-5, and optionally, wherein the apparatus is configured to cause the wireless communication device to determine the energy state of the 2.16 GHz channel BW based on energy detection over an mmWave wireless communication channel having a channel BW less than 2.16 Ghz, which is centered at a center of the 2.16 GHz channel BW.

Example 7 includes the subject matter of any one of Examples 1-6, and optionally, wherein the apparatus is configured to cause the wireless communication device to determine the energy state of the 2.16 GHz channel BW based on energy detection over an mmWave wireless communication channel, which is entirely covered by the 2.16 GHz channel BW, and which has an mmWave channel BW, which is equal to or greater than a predefined energy detection BW less than 2.16 GHz.

Example 8 includes the subject matter of Example 7, and optionally, wherein the predefined energy detection BW is 320 MHz.

Example 9 includes the subject matter of Example 7, and optionally, wherein the predefined energy detection BW is 640 MHz.

Example 10 includes the subject matter of any one of Examples 1-9, and optionally, wherein the energy detection mechanism is based on energy detection during an energy detection period, which is equal to or longer than a beacon period over the 2.16 GHz channel BW.

Example 11 includes the subject matter of any one of Examples 1-10, and optionally, wherein the energy detection mechanism is based on energy detection during an energy detection period of at least 100 milliseconds.

Example 12 includes the subject matter of any one of Examples 1-11, and optionally, wherein the apparatus is configured to determine the energy state of the 2.16 GHz channel BW based on a comparison between a detected energy over the 2.16 GHz channel BW and an energy detection threshold.

Example 13 includes the subject matter of any one of Examples 1-12, and optionally, wherein the apparatus is configured to select, based on the energy state of the 2.16 GHz channel BW, between allowing or disabling the wireless communication device to establish at least one of a link or a Basic Service Set (BSS) over the mmWave wireless communication channel.

Example 14 includes the subject matter of any one of Examples 1-13, and optionally, wherein the apparatus is configured to select to allow the wireless communication device to transmit the mmWave PPDU over the mmWave wireless communication channel only when the 2.16 GHz channel BW is determined to have a free energy state.

Example 15 includes the subject matter of any one of Examples 1-14, and optionally, wherein the apparatus is configured to select to disable the wireless communication device to transmit the mmWave PPDU over the mmWave wireless communication channel when the 2.16 GHz channel BW is determined to have a busy energy state.

Example 16 includes the subject matter of any one of Examples 1-15, and optionally, wherein the mmWave channel BW of the mmWave wireless communication channel is at least 160 MHz.

Example 17 includes the subject matter of any one of Examples 1-16, and optionally, wherein the mmWave wireless communication frequency band comprises a 60 GHz frequency band.

Example 18 includes the subject matter of any one of Examples 1-17, and optionally, comprising at least one radio to transmit the mmWave PPDU.

Example 19 includes the subject matter of Example 18, and optionally, comprising one or more antennas connected to the radio, and a processor to execute instructions of an operating system of the wireless communication device.

Example 20 includes an apparatus comprising logic and circuitry configured to cause a wireless communication device to generate an information element comprising millimeterWave (mmWave) channel information to identify an mmWave wireless communication channel in a mmWave wireless communication frequency band, and version information to identify an mmWave Physical layer (PHY) Protocol Data Unit (PPDU) version of a PPDU to be communicated over the mmWave wireless communication channel;

and transmit a frame over a sub 10 Gigahertz (GHz) (sub-10 GHz) wireless communication channel, the frame comprising the information element comprising the mmWave channel information and the version information.

Example 21 includes the subject matter of Example 20, and optionally, wherein the mmWave channel information is configured to indicate a central frequency of the mmWave wireless communication channel, and a bandwidth of the mmWave wireless communication channel.

Example 22 includes the subject matter of Example 20 or 21, and optionally, wherein the mmWave channel information comprises an operating class of the mmWave wireless communication channel, and a channel number of the mmWave wireless communication channel.

Example 23 includes the subject matter of any one of Examples 20-22, and optionally, wherein the frame comprises a neighbor report element comprising the information element comprising the mmWave channel information and the version information.

Example 24 includes the subject matter of Example 23, and optionally, wherein the neighbor report element comprises a reduced neighbor report element comprising a Target Beacon Transmission Time (TBTT) information field, the TBTT information field comprising the information element comprising the mmWave channel information and the version information.

Example 25 includes the subject matter of Example 24, and optionally, wherein the apparatus is configured to cause the wireless communication device to set a Target Beacon Transmission Time (TBTT) offset field in the reduced neighbor report element to identify a beacon frame transmitted over the mmWave wireless communication channel.

Example 26 includes the subject matter of any one of Examples 20-25, and optionally, wherein the information element comprises a version field comprising a predefined version value to identify the mmWave PPDU version.

Example 27 includes the subject matter of any one of Examples 20-26, and optionally, wherein the version information comprises a predefined version value from a plurality of predefined version values corresponding to a respective plurality of mmWave PPDU versions.

Example 28 includes the subject matter of Example 27, and optionally, wherein the plurality of predefined version values comprises a first version value corresponding to an mmWave PPDU version configured for an integer multiple of a 2.16 Gigahertz (GHz) channel Bandwidth (BW), and a second version value corresponding to an mmWave PPDU version configured for an mmWave channel BW of at least 80 Megahertz (MHz), which is different from the 2.16 GHz channel BW.

Example 29 includes the subject matter of any one of Examples 20-28, and optionally, wherein the frame comprises a beacon or a probe response.

Example 30 includes the subject matter of any one of Examples 20-29, and optionally, wherein the wireless communication device comprise a Multi-Link Device (MLD) comprising a first wireless communication station (STA) to communicate over the mmWave wireless communication channel, and a second STA to communicate over the sub-10 GHz wireless communication channel.

Example 31 includes the subject matter of any one of Examples 20-30, and optionally, wherein the mmWave wireless communication frequency band comprises a 60 GHz frequency band.

Example 32 includes the subject matter of any one of Examples 20-31, and optionally, wherein the sub-10 GHz wireless communication channel comprises a channel in a 2.4 GHz wireless communication frequency band, a channel in a 5 GHz wireless communication frequency band, or a channel in a 6 GHz wireless communication frequency band.

Example 33 includes the subject matter of any one of Examples 20-32, and optionally, comprising at least one radio to transmit the frame.

Example 34 includes the subject matter of Example 33, and optionally, comprising one or more antennas connected to the radio, and a processor to execute instructions of an operating system of the wireless communication device.

Example 35 includes an apparatus comprising logic and circuitry configured to cause a wireless communication device to process an information element in a frame received over a sub 10 Gigahertz (GHz) (sub-10 GHz) wireless communication channel, the information element comprising millimeterWave (mmWave) channel information to identify an active mmWave wireless communication channel in a mmWave wireless communication frequency band; and based on the mmWave channel information, disable the wireless communication device to communicate over an mmWave wireless communication channel, which at least partially overlaps the active mmWave wireless communication channel.

Example 36 includes the subject matter of Example 35, and optionally, wherein the mmWave channel information is configured to indicate a central frequency of the active mmWave wireless communication channel, and a bandwidth of the active mmWave wireless communication channel.

Example 37 includes the subject matter of Example 35 or 36, and optionally, wherein the mmWave channel information comprises an operating class of the active mmWave wireless communication channel, and a channel number of the active mmWave wireless communication channel.

Example 38 includes the subject matter of any one of Examples 35-37, and optionally, wherein the frame comprises a neighbor report element comprising the information element comprising the mmWave channel information.

Example 39 includes the subject matter of Example 38, and optionally, wherein the neighbor report element comprises a reduced neighbor report element comprising a Target Beacon Transmission Time (TBTT) information field, the TBTT information field comprising the information element comprising the mmWave channel information.

Example 40 includes the subject matter of Example 39, and optionally, wherein the apparatus is configured to cause the wireless communication device to process a Target Beacon Transmission Time (TBTT) offset field in the reduced neighbor report element to identify a beacon frame transmitted over the mmWave wireless communication channel.

Example 41 includes the subject matter of any one of Examples 35-40, and optionally, wherein the information element comprises version information to identify an mmWave Physical layer (PHY) Protocol Data Unit (PPDU) version of a PPDU to be communicated over the active mmWave wireless communication channel.

Example 42 includes the subject matter of Example 41, and optionally, wherein the information element comprises a version field comprising a predefined version value to identify the mmWave PPDU version.

Example 43 includes the subject matter of Example 41 or 42, and optionally, wherein the version information comprises a predefined version value from a plurality of predefined version values corresponding to a respective plurality of mmWave PPDU versions.

Example 44 includes the subject matter of Example 43, and optionally, wherein the plurality of predefined version values comprises a first version value corresponding to an mmWave PPDU version configured for an integer multiple of a 2.16 Gigahertz (GHz) channel Bandwidth (BW), and a first version value corresponding to an mmWave PPDU version configured for an mmWave channel BW of at least 80 Megahertz (MHz), which is different from the 2.16 GHz channel BW.

Example 45 includes the subject matter of any one of Examples 35-44, and optionally, wherein the frame comprises a beacon or a probe response.

Example 46 includes the subject matter of any one of Examples 35-45, and optionally, wherein the wireless communication device comprise a Multi-Link Device (MLD) comprising a first wireless communication station (STA) to communicate over the mmWave wireless communication channel, and a second STA to communicate over the sub-10 GHz wireless communication channel.

Example 47 includes the subject matter of any one of Examples 35-46, and optionally, wherein the mmWave wireless communication frequency band comprises a 60 GHz frequency band.

Example 48 includes the subject matter of any one of Examples 35-47, and optionally, wherein the sub-10 GHz wireless communication channel comprises a channel in a 2.4 GHz wireless communication frequency band, a channel in a 5 GHz wireless communication frequency band, or a channel in a 6 GHz wireless communication frequency band.

Example 49 includes the subject matter of any one of Examples 35-48, and optionally, comprising at least one radio to receive the frame.

Example 50 includes the subject matter of Example 49, and optionally, comprising one or more antennas connected to the radio, and a processor to execute instructions of an operating system of the wireless communication device.

Example 51 comprises a wireless communication device comprising the apparatus of any of Examples 1-50.

Example 52 comprises an apparatus comprising means for executing any of the described operations of any of Examples 1-50.

Example 53 comprises a product comprising one or more tangible computer-readable non-transitory storage media comprising computer-executable instructions operable to, when executed by at least one processor, enable the at least one processor to cause a wireless communication device to perform any of the described operations of any of Examples 1-50.

Example 54 comprises an apparatus comprising: a memory interface; and processing circuitry configured to: perform any of the described operations of any of Examples 1-50.

Example 55 comprises a method comprising any of the described operations of any of Examples 1-50.

Functions, operations, components and/or features described herein with reference to one or more aspects, may be combined with, or may be utilized in combination with, one or more other functions, operations, components and/or features described herein with reference to one or more other aspects, or vice versa.

While certain features have been illustrated and described herein, many modifications, substitutions, changes, and equivalents may occur to those skilled in the art. It is, therefore, to be understood that the appended claims are intended to cover all such modifications and changes as fall within the true spirit of the disclosure.

What is claimed is:

1. An apparatus comprising logic and circuitry configured to cause a wireless communication device to:

determine an energy state of a 2.16 Gigahertz (GHz) channel bandwidth (BW) in a millimeterWave (mmWave) wireless communication frequency band according to an energy detection mechanism; and based on the energy state of the 2.16 GHz channel BW, select between allowing or disabling the wireless communication device to transmit an mmWave Physical layer (PHY) Protocol Data Unit (PPDU) over an mmWave wireless communication channel, which at least partially overlaps the 2.16 GHz channel BW and is different from the 2.16 GHz channel BW, the mmWave wireless communication channel having an mmWave channel BW of at least 80 Megahertz (MHz).

2. The apparatus of claim 1 configured to cause the wireless communication device to determine the energy state of the 2.16 GHz channel BW based on energy detection over one or more mmWave wireless communication channels, which are at least partially covered by the 2.16 GHz channel BW.

3. The apparatus of claim 1 configured to cause the wireless communication device to determine the energy state of the 2.16 GHz channel BW based on energy detection scanning over a plurality of mmWave wireless communication channels, which are at least partially covered by the 2.16 GHz channel BW.

4. The apparatus of claim 1 configured to cause the wireless communication device to determine the energy state of the 2.16 GHz channel BW based on energy detection scanning over all mmWave wireless communication channels defined according to an mmWave channelization scheme, which are at least partially covered by the 2.16 GHz channel BW.

5. The apparatus of claim 1 configured to cause the wireless communication device to determine the energy state of the 2.16 GHz channel BW based on energy detection over a largest mmWave wireless communication channel, which is supported by the wireless communication device, and which is entirely covered by the 2.16 GHz channel BW.

6. The apparatus of claim 1 configured to cause the wireless communication device to determine the energy state of the 2.16 GHz channel BW based on energy detection over an mmWave wireless communication channel having a channel BW less than 2.16 Ghz, which is centered at a center of the 2.16 GHz channel BW.

7. The apparatus of claim 1 configured to cause the wireless communication device to determine the energy state of the 2.16 GHz channel BW based on energy detection over an mmWave wireless communication channel, which is entirely covered by the 2.16 GHz channel BW, and which has an mmWave channel BW, which is equal to or greater than a predefined energy detection BW less than 2.16 GHz.

8. The apparatus of claim 1, wherein the energy detection mechanism is based on energy detection during an energy detection period, which is equal to or longer than a beacon period over the 2.16 GHz channel BW.

9. The apparatus of claim 1 configured to determine the energy state of the 2.16 GHz channel BW based on a comparison between a detected energy over the 2.16 GHz channel BW and an energy detection threshold.

10. The apparatus of claim 1 configured to select, based on the energy state of the 2.16 GHz channel BW, between allowing or disabling the wireless communication device to establish at least one of a link or a Basic Service Set (BSS) over the mmWave wireless communication channel.

11. The apparatus of claim 1 configured to select to allow the wireless communication device to transmit the mmWave PPDU over the mmWave wireless communication channel only when the 2.16 GHz channel BW is determined to have a free energy state.

12. The apparatus of claim 1 configured to select to disable the wireless communication device to transmit the mmWave PPDU over the mmWave wireless communication channel when the 2.16 GHz channel BW is determined to have a busy energy state.

13. The apparatus of claim 1, wherein the mmWave channel BW of the mmWave wireless communication channel is at least 160 MHz.

14. The apparatus of claim 1, wherein the mmWave wireless communication frequency band comprises a 60 GHz frequency band.

15. The apparatus of claim 1 comprising at least one radio to transmit the mmWave PPDU.

16. The apparatus of claim 15 comprising one or more antennas connected to the radio, and a processor to execute instructions of an operating system of the wireless communication device.

17. A product comprising one or more tangible computer-readable non-transitory storage media comprising computer-executable instructions operable to, when executed by at least one processor, enable the at least one processor to cause a wireless communication device to:

process an information element in a frame received over a sub 10 Gigahertz (GHz) (sub-10 GHz) wireless communication channel, the information element comprising millimeterWave (mmWave) channel information to identify an active mmWave wireless communication channel in a mmWave wireless communication frequency band; and based on the mmWave channel information, disable the wireless communication device to communicate over an mmWave wireless communication channel, which at least partially overlaps the active mmWave wireless communication channel.

18. The product of claim 17, wherein the mmWave channel information is configured to indicate a central frequency of the active mmWave wireless communication channel, and a bandwidth of the active mmWave wireless communication channel.

19. The product of claim 17, wherein the information element comprises version information to identify an mmWave Physical layer (PHY) Protocol Data Unit (PPDU) version of a PPDU to be communicated over the active mmWave wireless communication channel.

* * * * *